United States Patent
Zeng et al.

(10) Patent No.: US 12,457,287 B2
(45) Date of Patent: Oct. 28, 2025

(54) COMMUNICATION METHOD AND APPARATUS

(71) Applicant: Huawei Technologies Co., Ltd., Shenzhen (CN)

(72) Inventors: Yongbo Zeng, Shenzhen (CN); Hongcheng Zhuang, Shenzhen (CN); Cheng Qin, Beijing (CN); Tao Guo, Xi'an (CN); Hui Jin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 18/044,023

(22) PCT Filed: Aug. 5, 2021

(86) PCT No.: PCT/CN2021/110989
§ 371 (c)(1),
(2) Date: Mar. 3, 2023

(87) PCT Pub. No.: WO2022/048393
PCT Pub. Date: Mar. 10, 2022

(65) Prior Publication Data
US 2023/0328170 A1    Oct. 12, 2023

(30) Foreign Application Priority Data
Sep. 4, 2020  (CN) .................. 202010924344.7

(51) Int. Cl.
*H04M 1/72457*  (2021.01)
*H04W 36/30*  (2009.01)
(Continued)

(52) U.S. Cl.
CPC ..... *H04M 1/72457* (2021.01); *H04W 40/248* (2013.01); *H04W 36/302* (2023.05); *H04W 88/06* (2013.01)

(58) Field of Classification Search
CPC .......... H04M 1/72457; H04W 40/248; H04W 36/302; H04W 88/06; H04W 48/18; H04W 8/183; H04W 36/00838
See application file for complete search history.

(56) References Cited

U.S. PATENT DOCUMENTS 9,635,541 B2*    4/2017  Chong ................ H04W 76/12
2013/0203438 A1*  8/2013  Shin ..................... H04W 64/00
                                                          455/456.1
(Continued)

FOREIGN PATENT DOCUMENTS

CN        103167408 A    6/2013
CN        105813086 A    7/2016
(Continued)

OTHER PUBLICATIONS

CN 105813086 A (Year: 2016).*
(Continued)

*Primary Examiner* — Nizar N Sivji
(74) *Attorney, Agent, or Firm* — Conley Rose, P.C.

(57) ABSTRACT

A communication method includes a terminal device having a dual-card function that obtains, before passing through a target section and from a network device, network status information of the target section through which the terminal device is about to pass, and determines, in advance based on the network status information, a target subscriber identity module (SIM) card used when the terminal device passes through the target section. Subsequently, before or when the terminal device passes through the target section, the terminal device can switch to the target SIM card in advance for communication.

20 Claims, 11 Drawing Sheets

(51) Int. Cl.
  *H04W 40/24*      (2009.01)
  *H04W 88/06*      (2009.01)

(56) References Cited

U.S. PATENT DOCUMENTS

| | | | |
|---|---|---|---|
| 2014/0099967 A1* | 4/2014 | Egner | H04W 48/18 |
| | | | 455/452.2 |
| 2014/0099978 A1 | 4/2014 | Egner et al. | |
| 2014/0342700 A1* | 11/2014 | Srinivasan | H04W 36/0019 |
| | | | 455/411 |
| 2016/0302171 A1* | 10/2016 | Krauss | H04B 7/18554 |
| 2016/0345377 A1* | 11/2016 | Lindoff | H04W 76/27 |
| 2016/0353449 A1* | 12/2016 | Chuttani | H04W 4/14 |
| 2017/0171902 A1* | 6/2017 | Tillman | H04W 76/16 |
| 2017/0195947 A1* | 7/2017 | Korneluk | H04W 48/16 |
| 2018/0184309 A1* | 6/2018 | Bhardwaj | H04W 72/542 |
| 2019/0306675 A1* | 10/2019 | Xue | H04W 4/40 |
| 2020/0084814 A1* | 3/2020 | Lindoff | H04W 64/00 |
| 2021/0051553 A1* | 2/2021 | Wei | H04W 88/06 |

FOREIGN PATENT DOCUMENTS

| | | | | |
|---|---|---|---|---|
| CN | 106211123 | A | 12/2016 | |
| CN | 106953652 | A | 7/2017 | |
| CN | 107548114 | A | 1/2018 | |
| CN | 111246389 | A | 6/2020 | |
| CN | 111447659 | A | 7/2020 | |
| EP | 3301976 | A1 * | 4/2018 | H04W 36/28 |

OTHER PUBLICATIONS

CN 107548114 A (Year: 2018).*
CN 111246389 A (Year: 2020).*
CN 111447659 A (Year: 2020).*
WO 2015177602 A1 (Year: 2015).*
WO 2017012532 A1 (Year: 2017).*

* cited by examiner

COMMUNICATION METHOD AND APPARATUS

CROSS-REFERENCE TO RELATED APPLICATIONS

This is a U.S. National Stage of International Patent Application No. PCT/CN2021/110989 filed on Aug. 5, 2021, which claims priority to Chinese Patent Application No. 202010924344.7 filed on Sep. 4, 2020. Both of the aforementioned applications are incorporated herein by reference in their entireties.

TECHNICAL FIELD

This application relates to the field of communications technologies, and in particular, to a communication method and apparatus.

BACKGROUND

With continuous development of communications technologies, a user may use a terminal device such as a mobile phone or a tablet computer to perform communication anytime and anywhere. When the user uses the terminal device in a communication scenario such as road transportation or rail transportation, for example, in a high-speed railway train that runs at a high speed, the terminal device used by the user is in a high-speed moving state. In this case, the terminal device may be frequently handed over, along with a running direction of the train, in cells that are along a railway line and that are provided by an operator, and duration reserved for the terminal device to perform handover is reduced due to high-speed movement of the terminal device. Consequently, a communication interruption caused by a cell handover failure may occur on the terminal device during the high-speed movement. Therefore, some operators deploy a dedicated communication network along a railway line of a high-speed railway, to ensure that the terminal device in high-speed movement can still perform normal communication. In addition, to reduce a probability that the terminal device fails to access a cell during movement, the operator or another vendor may provide a preset handover sequence (or referred to as a preset path) for each terminal device, and the terminal device accesses, according to the preset handover sequence, a cell set by the operator along the railway line.

In addition, some terminal devices such as mobile phones have a dual-card function. A user may dispose two different subscriber identity module (Subscriber Identity Module, SIM) cards in a same terminal device, and select one of the SIM cards as a default mobile data service card for communication (that is, set the SIM card as a primary card). When the terminal device having the dual-card function moves at a high speed, if some coverage holes exist in a cellular network of an operator to which the SIM card selected by the user as the primary card belongs, communication of the terminal device is still interrupted. This deteriorates user experience of the terminal device.

This application provides a communication method and apparatus, to resolve a technical problem in the conventional technology that a mobile phone having a dual-card function encounters a terminal device communication interruption in a coverage hole area of a cellular network of an operator to which a SIM card selected by a user as a primary card belongs. Specifically, before passing through a target section, a terminal device determines, in advance, a target SIM card with better network performance in cellular networks of operators to which at least two communication modules disposed in the terminal device belong, as a primary card for communication. This reduces a communication interruption that is caused by a coverage hole and that may be encountered by the terminal device when the terminal device actually passes through the target section, thereby improving user experience of the terminal device.

A first aspect of this application provides a communication method, applied to a terminal device having a dual-card function. Before passing through a target section, the terminal device determines, in advance based on coverage areas or coverage performance that is of operators to which two SIM cards belong and that is in network status information, a target SIM card for communication that has better communication performance and that is used when the terminal device passes through the target section. Subsequently, before or when the terminal device actually passes through the target section, the terminal device can switch to the target SIM card in advance for communication. In this way, a case such as a communication interruption caused by using another SIM card in the target section is avoided, and higher communication quality is obtained when the terminal device actually passes through the target section, to reduce a communication interruption that may be caused by a coverage hole and that may be encountered by the terminal device, improve communication efficiency of the terminal device, and improve user experience.

In an embodiment of the first aspect of this application, the terminal device specifically first obtains preset path information, obtains the network status information in the target section from the preset path information, and then determines the target SIM card based on the network status information in the target section. The preset path information includes network status information of all at least two SIM cards disposed in the terminal device on at least one preset path, the at least one preset path includes a first preset path on which the terminal device is currently located, and the first preset path includes the target section, Therefore, in Embodiment 3, when the terminal device does not send second indication information to a network device, the network device may send the preset path information or network status information of some target sections in the preset path information to the terminal device, to reduce information interaction between the terminal device and the network device, improve autonomy when the network device sends the network status information in the target section to the terminal device, and improve communication efficiency between the terminal device and the network device.

In an embodiment of the first aspect of this application, the terminal device may, specifically obtain the preset path information sent by the network device, or may receive the preset path information sent by the network device after sending the second indication information to the network device to indicate information about the operators to which the at least two communication modules used by the terminal device belong. In this embodiment, the terminal device actively requests or the network device actively sends the preset path information, so that the terminal device can determine the target SIM card by using the network status information in the target section, and the network device may not need to send information to the terminal device to indicate the target SIM card. This reduces exchange of related indication information between the network device and the terminal device and a definition of the indication information, and can also improve the communication efficiency between the terminal device and the network device.

In an embodiment of the first aspect of this application, the network status information in the target section may be an ID of a covered cell that is of operators to which at least two communication modules belong and that is in the target section. In this case, the terminal device may perform, in a quantized weighting manner by using the received network status information in the target section, quantized evaluation on coverage areas of base stations or cells that are set by operators corresponding to the two SIM cards and that are in the target section. A larger coverage area indicates a larger weighted value, indicating better communication performance of a SIM card. For example, the terminal device specifically may weight, based on a coverage area, a cell that is of a network of an operator to which each of the two communication modules belongs and that is in the target section, to obtain weighted coverage area values that are of the networks of the operators to which the at least two communication modules respectively belong and that are in the target section, and then determine, from the at least two communication modules, a communication module corresponding to a network that has a largest weighted coverage area value and that is of the networks of the operators as a target communication module.

In an embodiment of the first aspect of this application, in addition to the ID of the covered cell of the operator, the network status information further includes a communication quality parameter of each base station or cell, and the communication quality parameter is used to indicate communication performance of each base station. For example, the communication performance of the base station may be represented by one or more communication quality parameters of a call drop rate, a network disconnection rate, and an RRC re-establishment rate at a non-handover moment. In this case, the terminal device may weight, based on the communication quality parameter of each cell, cells that are of a network of an operator to which each of the at least two communication modules belongs and that are in the target section, to obtain weighted communication quality values that are of the networks of the operators to which the at least two communication modules respectively belong and that are in the target section, and then determine, from the at least two communication modules, a communication module that has a largest weighted communication quality parameter value and that is of the operators as the target communication module.

In an embodiment of the first aspect of this application, a specific quantity of nodes in front of the terminal device may be used as the target section. For example, N continuous nodes in front of a movement direction of the terminal device are used as the target section, where N may be a positive integer such as 50 or 100. Alternatively, a section between two target locations in front of a movement direction of the terminal device may be directly used as a target section A-B. The target location may be a site that can identify a location, such as a station, a factory, or a building. Therefore, the communication method provided in this embodiment has a clear feature in selecting a target section, and is easy in selection and implementation.

In an embodiment of the first aspect of this application, when performing SIM card switching, the terminal device may select, without affecting a current service of the terminal device, a node that is covered by networks of both operators corresponding to the two SIM cards. For example, the terminal device performs switching in the last node that is covered by the networks of both operators to which the two SIM cards belong before reaching the target section, or in the first node that is covered by the networks of both operators to which the two SIM cards belong when reaching the target section. In this way, on the basis of ensuring current communication quality of the terminal device, the target SIM card in the target section is switched, so that communication quality of the terminal device in an entire process is ensured, and user experience is further improved.

In an embodiment of the first aspect of this application, after determining that the terminal device is in a high-speed railway mode, the terminal device performs the step of determining the target SIM card and performing switching in this application; or after determining that the terminal device is in a high-speed railway mode, if the terminal device further determines that the terminal device moves on the first preset path, the terminal device may perform the step of determining the target SIM card and performing switching in this application. Therefore, in this embodiment, when the terminal device is in the high-speed railway mode or moves on a high-speed railway train, a procedure of determining the target SIM card and performing switching in this application can be automatically performed, thereby improving intelligence of this application and user experience.

In an embodiment of the first aspect of this application, when the terminal device performs SIM card switching before the terminal device passes through the target section, "automatic" switching of the terminal device can be implemented without a user instruction or a user notification. Alternatively, a display interface may display switching prompt information to a user, to indicate the user to perform the operation of switching to the target SIM card. After receiving confirmation information from the user, the terminal device switches to the target SIM card. Therefore, in this embodiment, after determining to switch the SIM card, the terminal device may prompt the user, and determine to perform switching based on a selection of the user, to increase diversified choices of the user for the terminal device, and provide more solutions. Switching is performed only after the user permits, thereby meeting requirements of different users.

In an embodiment of the first aspect of this application, the communication modules included in the terminal device may be subscriber identity modules, and the subscriber identity module may be specifically a SIM card, a USIM card, an eSIM card, or the like. Therefore, the terminal device to which the communication method provided in this embodiment is applied may include communication modules of different types, thereby enriching application scenarios for the communication method provided in this embodiment.

A second aspect of this application provides a communication method, applied to and performed by a network device on a peer side of the terminal device in the method provided in the first aspect. The method specifically includes: After receiving second indication information sent before the terminal device passes through a target section, the network device may determine, by using the second indication information, operators to which at least two communication modules used by the terminal device belong. Then, the network device may send preset path information to the terminal device, so that the terminal device can determine, in advance based on network status information in the target section in the preset path information before the terminal device passes through the target section, a target SIM card for communication that has better communication performance and that is used when the terminal device passes through the target section. Subsequently, before or when the terminal device actually passes through the target section, the terminal device can switch to the target SIM card in advance for communication. In this way, a case such as a communication interruption caused by using another SIM card in the target section is avoided, and higher communication quality is obtained when the terminal device actually passes through the target section, to reduce a communication interruption that may be caused by a coverage hole and that may be encountered by the terminal device, improve communication efficiency of the terminal device, and improve user experience.

In an embodiment of the second aspect of this application, the network status information includes an ID of a cell that is in continuous nodes and that is covered by a network of an operator.

In an embodiment of the second aspect of this application, the network device may perform, in a quantized weighting manner by using the received network status information in the target section, quantized evaluation on coverage areas of base stations or cells that are set by operators corresponding to the two SIM cards and that are in the target section. A larger coverage area indicates a larger weighted value, indicating better communication performance of a SIM card. For example, the network device specifically may weight, based on a coverage area, a cell that is of a network of an operator to which each of the two communication modules belongs and that is in the target section, to obtain weighted coverage area values that are of the networks of the operators to which the at least two communication modules respectively belong and that are in the target section, and then determine, from the at least two communication modules, a communication module corresponding to a network that has a largest weighted coverage area value and that is of the networks of the operators as a target communication module.

In an embodiment of the second aspect of this application, in addition to the ID of the covered cell of the operator, the network status information further includes a communication quality parameter of each base station or cell, and the communication quality parameter is used to indicate communication performance of each base station. For example, the communication performance of the base station may be represented by one or more communication quality parameters of a call drop rate, a network disconnection rate, and an RRC re-establishment rate at a non-handover moment.

In an embodiment of the second aspect of this application, the network device may weight, based on the communication quality parameter of each cell, cells that are of a network of an operator to which each of the at least two communication modules belongs and that are in the target section, to obtain weighted communication quality values that are of the networks of the operators to which the at least two communication modules respectively belong and that are in the target section, and then determine, from the at least two communication modules, a communication module that has a largest weighted communication quality parameter value and that is of the operators as the target communication module.

A third aspect of this application provides a communication apparatus that may be configured to perform the communication method according to the first aspect of this application. For example, the communication apparatus includes a determining module, a switching module, and a communication module. The determining module is configured to: before entering a target section on a first preset path, determine a target communication module from at least two communication modules based on prestored network status information of the at least two communication modules in the target section; or receive first indication information sent by a network device, where the first indication information is used to indicate a target communication module, and the target communication module is determined by the network device from at least two communication modules based on prestored network status information of the at least two communication modules in the target section. The switching module is configured to: before or when entering the target section, switch a communication module used by a terminal from a first communication module to the target communication module. The communication module is configured to perform communication by using the target communication module.

In an embodiment of the second aspect of this application, the communication modules included in the terminal device may be subscriber identity modules, and the subscriber identity module may be specifically a SIM card, a USIM card, an eSIM card, or the like. Therefore, the terminal device to which the communication method provided in this embodiment is applied may include communication modules of different types, thereby enriching application scenarios for the communication method provided in this embodiment.

In an embodiment of the third aspect of this application, the determining module is specifically configured to: obtain preset path information, where the preset path information includes network status information of operators to which the at least two communication modules belong on at least one preset path, and the at least one preset path includes the first preset path; and determine the target communication module from the at least two communication modules based on the preset path information.

In an embodiment of the third aspect of this application, the determining module is specifically configured to obtain the preset path information sent by a network device, where the preset path information includes network status information of a plurality of operators on a plurality of preset paths, and the plurality of operators include the operators to which the at least two communication modules belong; or the communication module is specifically configured to: send second indication information to a network device, where the second indication information is used to indicate information about the operators to which the at least two communication modules belong; and receive the preset path information that is sent by the network device and that includes the operators to which the at least two communication modules belong.

In an embodiment of the third aspect of this application, the preset path information includes the network status information of the operators to which the at least two communication modules belong on the at least one preset path, and the first preset path of the at least one path includes the target section.

In an embodiment of the third aspect of this application, the network status information includes an ID of a cell that is in continuous nodes and that is covered by a network of an operator, where each node is a section of a preset length on a preset path. In this case, the determining module is specifically configured to: weight, based on a coverage area, a cell that is of a network of an operator to which each of the at least two communication modules belongs and that is in the target section, to obtain weighted coverage area values that are of the networks of the operators to which the al least two communication modules respectively belong and that are in the target section; and determine, from the at least two communication modules, a communication module corresponding to a network that has a largest weighted coverage area value and that is of the networks of the operators as the target communication module.

In an embodiment of the third aspect of this application, the network information includes an ID of a cell that is in continuous nodes and that is covered by a network of an operator, and a communication quality parameter of each cell, Where each node is a section of a preset length on a preset path. In this case, the determining module is specifically configured to: weight, based on a communication quality parameter of each cell, cells that are of a network of an operator to which each of the at least two communication modules belongs and that are in the target section, to obtain weighted communication quality values that are of the networks of the operators to which the at least two communication modules respectively belong and that are in the target section; and determine, from the at least two communication modules, a communication module that has a largest weighted communication quality parameter value and that is of the operators as the target communication module.

In an embodiment of the third aspect of this application, the switching module is specifically configured to: in the last cell that is covered by both the first communication module and the target communication module before entering the target section, or in the first cell that is covered by both the first communication module and the target communication module after entering the target section, switch the communication module used by the terminal from the first communication module to the target communication module.

In an embodiment of the third aspect of this application, the determining module is specifically configured to: determine that the terminal is in a high-speed railway mode; and when the terminal is in the high-speed railway mode, before the before entering a target section on a first preset path, determine a target communication module from the at least two communication modules based on prestored network status information of the at least two communication modules in the target section; or when the terminal moves on the first preset path, determine a target communication module from the at least two communication modules based on prestored network status information of the at least two communication modules in the target section.

In an embodiment of the third aspect of this application, the apparatus further includes a display module, configured to display switching prompt information on a display interface. In this case, the determining module is specifically configured to: when receiving confirmation information from a user, switch the communication module used by the terminal from the first communication module to the target communication module.

In an embodiment of the third aspect of this application, the communication module is a subscriber identity module.

In an embodiment of the third aspect of this application, the subscriber identity module includes a subscriber identity module SIM card, a universal subscriber identity module USIM card, or an embedded subscriber identity module eSIM card.

A fourth aspect of this application provides a communication apparatus that may be configured to perform the communication method according to the second aspect of this application. The apparatus includes a transceiver module and a processing module. The transceiver module is configured to receive second indication information sent by a terminal, where the second indication information is used to indicate information about an operator to which at least two communication modules disposed in the terminal belong, and the at least two communication modules belong to different operators. The transceiver module is further configured to: send, to the terminal, preset path information including network status information of the at least two communication modules, where the preset path information includes network status information of the at least two communication modules on a first preset path, and the first preset path includes a target section; or determine, from the at least two communication modules based on the preset path information, a target communication module to be used by the terminal in a target section, where the preset path information includes network status information of the at least two communication modules on a first preset path; and send first indication information to the terminal, where the first indication information is used to indicate the target communication module.

In an embodiment of the fourth aspect of this application, the network status information includes an ID of a cell that is in continuous nodes and that is covered by a network of an operator, where each node is a section of a preset length on a preset path.

In an embodiment of the fourth aspect of this application, the processing module is specifically configured to: weight, based on a coverage area, a cell that is of a network of an operator to which each of the at least two communication modules belongs and that is in the target section, to obtain weighted coverage area values that are of the networks of the operators to which the at least two communication modules respectively belong and that are in the target section; and determine, from the at least two communication modules, a communication module corresponding to a network that has a largest weighted coverage area value and that is of the networks of the operators as the target communication module.

In an embodiment of the fourth aspect of this application, the network status information includes an ID of a cell that is in continuous nodes and that is covered by a network of an operator, and a communication quality parameter of each cell.

In an embodiment of the fourth aspect of this application, the processing module is specifically configured to: weight, based on a communication quality parameter of each cell, cells that are of a network of an operator to which each of the at least two communication modules belongs and that are in the target section, to obtain weighted communication quality values that are of the networks of the operators to which the at least two communication modules respectively belong and that are in the target section and determine, from the at least two communication modules, a communication module that has a largest weighted communication quality parameter value and that is of the operators as the target communication module.

In an embodiment of the fourth aspect of this application, the communication module is a subscriber identity module.

In an embodiment of the fourth aspect of this application, the subscriber identity module includes a subscriber identity module SIM card, a universal subscriber identity module USIM card, or an embedded subscriber identity module eSIM card.

According to a fifth aspect, an embodiment of this application provides a communication apparatus, including a processor and a communication interface. The processor sends data through the communication interface. The processor is configured to implement the method performed by the terminal device in the first aspect.

In a possible design, the communication apparatus further includes a memory. The memory is configured to store program code, and the processor executes the program code stored in the memory, to enable the communication apparatus to perform the method performed by the terminal device in the first aspect.

According to a sixth aspect, an embodiment of this application provides a communication apparatus, including a processor and a communication interface. The processor sends data through the communication interface. The processor is configured to implement the method performed by the network device in the second aspect.

In a possible design, the communication apparatus further includes a memory. The memory is configured to store program code, and the processor executes the program code stored in the memory, to enable the communication apparatus to perform the method performed by the network device in the second aspect.

According to a seventh aspect, this application provides a communication system, including the communication apparatus according to any one of the third aspect of this application as a terminal device and the communication apparatus according to any one of the fourth aspect of this application as a network device.

DESCRIPTION OF EMBODIMENTS

Figure 1:
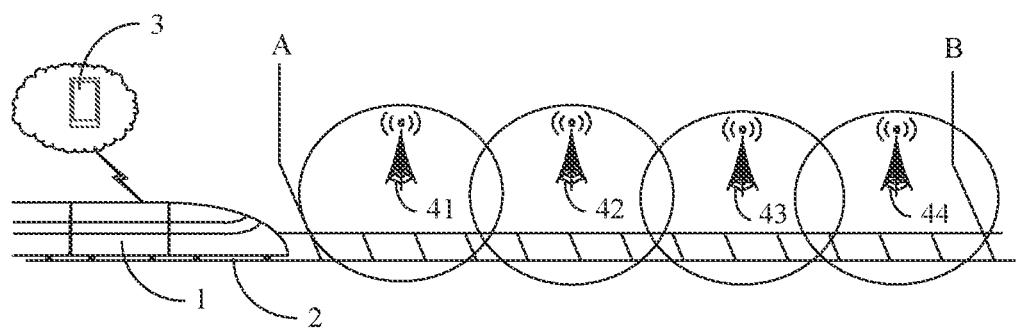
FIG. 1 is a schematic diagram of a technical background to which this application is applied.

FIG. 1 is a schematic diagram of a technical background to which this application is applied. This application is applied to a scenario in which a terminal device performs communication in a traffic device such as a road traffic device or a rail transportation device when the terminal device moves, especially moves at a high speed. The communication includes but is not limited to making a call, sending an SMS message, or obtaining data by using the internet. The terminal device may be an electronic device having a communication function, such as a mobile phone, a tablet computer, or a vehicle-mounted terminal, and may also be referred to as a terminal, user equipment, UE, or the like. As shown in FIG. 1, an example in which a terminal device performs communication on a high-speed railway train that runs at a high speed is used. When a high-speed railway train 1 runs on a high-speed railway track 2, and a communication module (the communication module may be a SIM card) provided by an operator X is disposed in a terminal device 3 used by a user on the train 1. In this case, when the terminal device 3 moves on the track 2 along with the train 1, the terminal device 3 may enjoy a communication service provided by the operator by connecting to a base station (or specifically a cell borne by the base station) provided by the operator X aside the track 2. The base station connected to the terminal device 3 may be a base station that is of a dedicated communication network and that is specially set by the operator X for a terminal device running on the track 2, or a base station that is set by the operator X aside the track 2 based on an operation requirement.

Optionally, when the train 1 moves between a section A-B on the track 2 shown in FIG. 1, the terminal device 3 may be sequentially handed over from a cell 41 provided by the operator X to a cell 42, from the cell 42 to a cell 43, and from the cell 43 to a cell 44 based on coverage areas of different cells through which the train 3 passes, to keep that the terminal device 3 always accesses a cell of the operator X. In this way, the terminal device 3 can continuously perform cellular communication between the section A-B along with the train 1 without being handed over to a public-network cell to cause a possible interruption. A cell that provides a cellular network access service for a terminal may be borne by a physical entity base station. Therefore, in FIG. 1 and another figure in this application, a legend (a tower-shaped legend) of a base station is used to represent a cell. Each base station may bear one or more cells.

As a high-speed railway train moves faster, as shown in FIG. 1, the terminal device 3 is more frequently handed over in cells along a railway line, and duration left for the terminal device 3 to perform handover is less. For example, when the terminal device 3 is in a coverage area of the cell 41, the terminal device 3 may perform communication by using the cell 41. When the terminal device 3 moves along with the train 1 to an overlapping coverage area of the cell 41 and the cell 42, the terminal device 3 may perform cell handover preparation such as measurement and access request to be handed over to the cell 42. Then when the terminal device 3 is handed over from the access cell 41 to the access cell 42, and subsequently moves to a coverage area of the cell 42, the terminal device 3 may perform communication by using the cell 42, However, a higher speed of the train 1 indicates shorter duration for the train 1 to pass through the overlapping coverage area of the cell 41 and the cell 42, and therefore, shorter duration for the terminal device 3 to perform handover preparation in the section. Finally, the terminal device 3 may enter the coverage area of the cell 42 when the terminal device 3 cannot be handed over from the cell 41 to the cell 42, causing a communication interruption.

Therefore, in some technologies, to further improve a handover success rate of a terminal device and reduce a communication interruption caused by short duration for handover preparation by the terminal device during handover, a service provider (for example, an operator or another vendor) may send, to the terminal device in advance, information about a cell to which the terminal device is to be handed over, to reduce duration for handover preparation by the terminal device. For example, an operator provides cell handover information in advance. As shown in FIG. 1, when the terminal device 3 is about to pass through the section A-B along with the train 1, the operator X to which the SIM card used by the terminal device 3 belongs may send information (for example, the information about the cell includes a communication frequency) about the cells 41 to 44 in the section A-B to the terminal device in advance, so that when the terminal device 3 passes through the overlapping coverage area of the cell 41 and the cell 42 in the section A-B, the terminal device 3 may directly use, without performing excessive handover preparation, the information about the cell 42 provided by the operator X to be handed over from the access cell 41 to the access cell 42. This reduces duration required for the terminal device 3 to hand over between cells. When the train 1 is fast, it can also be ensured that the terminal device 3 is handed over from the cell 41 to the cell 42 in time before entering the cell 42, and communication of the terminal device 3 is not interrupted.

In some implementations, the operator X or another vendor needs to determine, in advance, information about cells deployed along a railway line, and arrange the information about the cells along the railway line in a sequence along a direction (unidirectional or bidirectional) of the track 2. As required, information about cells in a section through which the terminal device is to pass may be provided to the terminal device, so that the terminal device can perform handover based on the information about the cells in the section. The operator or another vendor may provide, for the terminal device based on information about a cell along each track, the information about the cell along the track, information about a cell along a track through which the terminal device passes, or information about a cell in a section through which the terminal device is to pass. Information about some or all cells deployed along one or more railway lines and network status information that are placed in the terminal may be referred to as a preset path, that is, each operator or another vendor may generate a preset path. The preset path includes a plurality of railway lines and information about cells arranged by corresponding operators in each railway line. For example, it is assumed that there are five railway lines (denoted as a railway 1, a railway 2, a railway 3, a railway 4, and a railway 5) and three operators (denoted as an operator Y1, an operator Y2, and an operator Y3) in total, a preset path that may be provided by the operator Y1 includes cell information along the railway 1, cell information along the railway 2, cell information along the railway 3, cell information along the railway 4, and cell information along the railway 5, that is, includes cell information along all the five railway lines. Similarly, a preset path of the operator Y2 includes the cell information along all the five railway lines: the railway 1, the railway 2, the railway 3, the railway 4, and the railway 5. A preset path of the operator Y3 includes the cell information along all the five railway lines: the railway 1, the railway 2, the railway 3, the railway 4, and the railway 5, and the like. In this case, when the terminal device 3 runs on the track 2 along with the high-speed railway train 1, the terminal device 3 may receive, in advance before passing through a section, information that is about a cell in a target section and that is provided by an operator or another vendor based on a preset path, so that the terminal device 3 can perform cell handover based on the information about the cell in the target section. Communication in which a terminal device directly performs handover on a high-speed railway by using information about a cell in a target section may be referred to as "high-speed railway mode" communication. The terminal device may automatically activate a "high-speed railway mode" based on a status of the terminal device, for example, an acceleration or a movement speed, or may activate a "high-speed railway mode" by a user manually, or may activate a "high-speed railway mode" based on a feature of a communication signal, for example, Doppler frequency offset estimation or a signal change trend. Certainly, a preset path may also be set in another manner. This is not limited in embodiments of the present invention.

Figure 2:
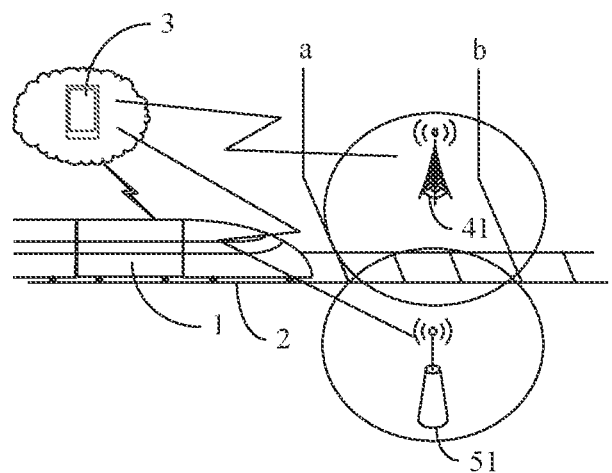
FIG. 2 is a schematic diagram of a scenario for a terminal device having a dual-card function.

In addition, some terminal devices have a "dual-card communication function", that is, two different communication modules may be disposed in the terminal device. The two different communication modules may be two different SIM cards. A user may select one of the SIM cards as a "primary card", and a call and/or a data communication service may be performed through a communication channel of the "primary card", and the other SIM card is correspondingly used as a "secondary card". The two SIM cards may be from different operators, or may support different communications standards. In other words, when using the terminal device, the user may dispose SIM cards of different operators for communication, or may dispose SIM cards of a same operator for communication. Communication includes data services and/or calls. For example, FIG. 2 is a schematic diagram of a scenario for a terminal device having a dual-card function. A terminal device 3 having a dual-card function moves on a track 2 along with a train 1, and a first SIM card provided by an operator X and a second SIM card provided by an operator Y are disposed in the terminal device 3. When a user selects the first SIM card as a "primary card", when the terminal device 3 passes through a section a-b on the track 2, the terminal device 3 uses the first SIM card to access a cell 41 provided by the operator X for communication. However, when the user selects the second SIM card as the "primary card", when the terminal device 3 passes through the section a-b on the track 2, the terminal device 3 uses the second SIM card to access a cell 51 provided by the operator Y for communication. Certainly, more than three communication modules may also be disposed in the terminal device, one communication module is a primary communication module, and the other communication modules are secondary communication modules, which is similar to that the terminal device includes two communication modules. Details are not described herein again. Operators to which the communication modules disposed in the terminal device belong may be completely the same, completely different, or partially different.

Figure 3:
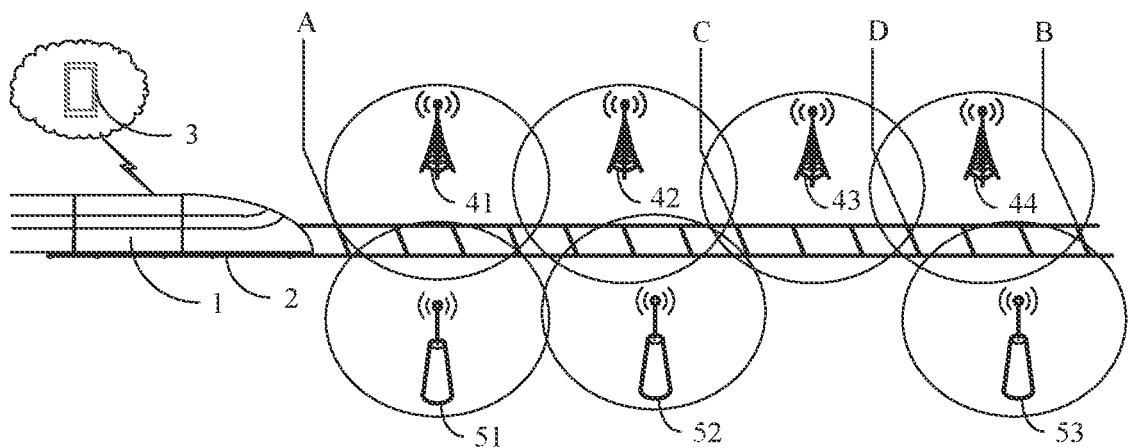
FIG. 3 is a schematic diagram of base stations set by different operators and cells borne by the base stations.

FIG. 3 is a schematic diagram of base stations set by different operators and cells borne by the base stations. In a section A-B of a track, an operator X sets cells 41 to 44 in sequence, and an operator Y sets cells 51 to 53 in sequence. The cell set by the operator X can cover the entire section A-B, but the cell set by the operator Y cannot cover a section C-D in the section A-B, and a coverage hole exists. In this case, when a user of a terminal device 3 selects a first SIM card provided by an operator X as a "primary card", and the terminal device 3 passes through the section A-B on a track 2, the terminal device 3 may perform handover based on a handover sequence of information about cells in the section A-D in a preset path and a sequence of the cells 41 to 44, and keep communication continuity without interruption. When a user of a terminal device 3 selects a second SIM card provided by an operator Y as a "primary card", and the terminal device 3 passes through the section A-B on a track 2, even if the terminal device determines a handover sequence of information about cells in the section A-D in a preset path, and performs handover sequentially from the cell 51 to the cell 53, a communication interruption still occurs in the section C-D, user experience of the terminal device is reduced.

Therefore, to resolve a technical problem that communication of a terminal device is interrupted due to a coverage hole of a cellular network of an operator of the SIM card, the terminal device provided in this application can determine, in advance based on information about a cell in a target section and before passing through the target section when traveling on a track along with a train, a target SIM card with better network performance in dual SIM cards as a "primary card" for communication, to reduce a communication interruption of the terminal device in the section, and improve user experience of the terminal device.

The following describes the technical solutions of this application in detail with reference to specific embodiments. The following several specific embodiments may be combined with each other, and a same or similar concept or process may not be described repeatedly in some embodiments.

Figure 4:
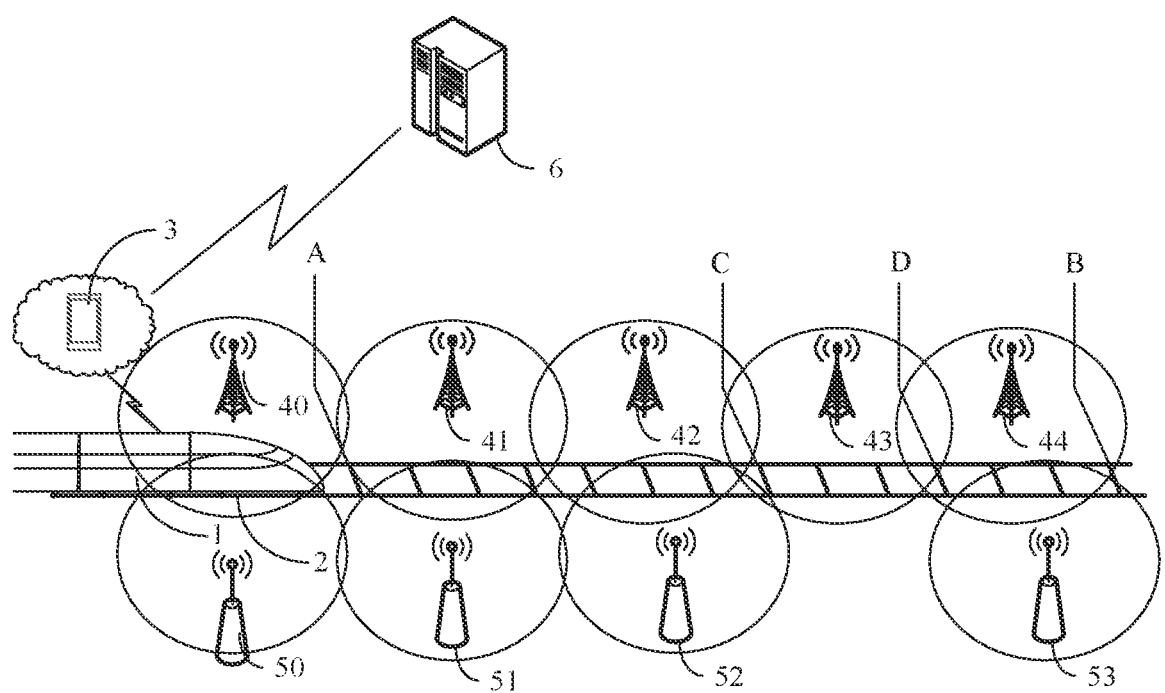
FIG. 4 is a schematic diagram of an embodiment of a scenario to which this application is applied.

FIG. 4 is a schematic diagram of an embodiment of a scenario to which this application is applied. This application is applied to a terminal device with at least two communication modules. The communication module may be a subscriber identity module (subscriber identity module, SIM) card, a universal subscriber identity module (universal subscriber identity module, USIM) card, an embedded subscriber identity module (embedded subscriber identity module, eSIM) card, or another module that can be used for communication. In embodiments of this application, only an example in which the communication module is the SIM card is used for description, but not limited thereto. For example, when a terminal device is provided with two communication modules, the communication module is a SIM card, the terminal device 3 has a dual-card function, and the two SIM cards belong to different operators, when or before the terminal device 3 runs on a track 2 at a high speed along with a high-speed railway train 1, the terminal device 3 interacts with a network device 6, so that the terminal device 3 can determine, in advance before passing through a target section A-B, a target SIM card used in the target section A-B, and when the terminal device actually passes through the target section A-B subsequently, the target SIM card can be used as a primary card for communication. Optionally, the network device 6 may be a server disposed by an operator, or a third party other than a user of the terminal device and the operators of the SIM cards, and may be configured to provide related information for determining the target SIM card for the terminal device 3.

Embodiment 1

Figure 5:
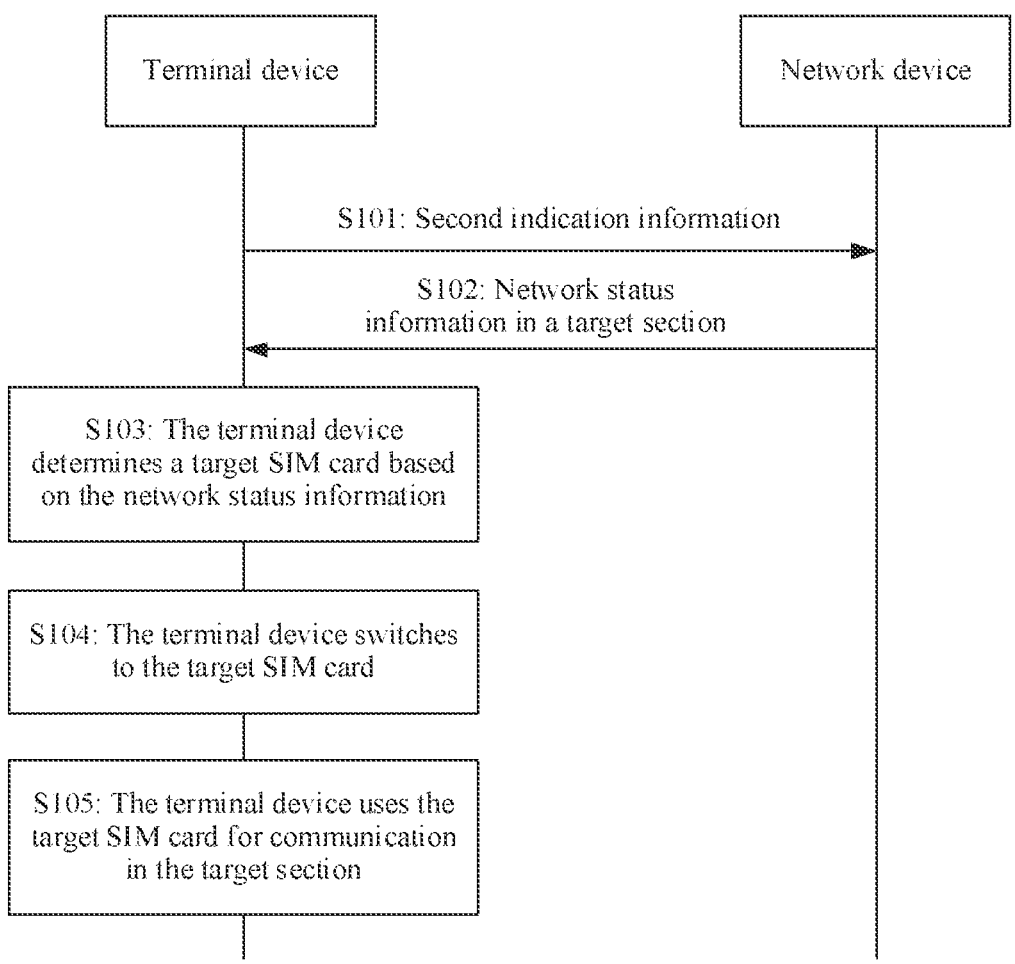
FIG. 5 is a schematic flowchart of an embodiment of a communication method according to this application.

FIG. 5 is a schematic flowchart of an embodiment of a communication method according to this application. The method shown in FIG. 5 may be applied to the scenario shown in FIG. 4. Specifically, the communication method provided in this embodiment includes the following steps.

S101: A terminal device sends second indication information to a network device, where the second indication information is used to indicate information about an operator of at least two SIM cards disposed in the terminal device. When two SIM cards are disposed in the terminal device, the two SIM cards disposed in the terminal device may be marked as a first SIM card and a second SIM card. Correspondingly, the network device receives the second indication information sent by the terminal device. Certainly, the terminal may further include another SIM card other than the two SIM cards, that is, the terminal includes more than two SIM cards.

In this embodiment, after activating a "high-speed railway mode" (or determining to enter the high-speed railway mode), the terminal device may send the second indication information to the network device in S101, to indicate the information about the operator of the two SIM cards disposed in the terminal device. After the terminal device activates the high-speed railway mode, the terminal device may perform cell handover based on a preset handover sequence when the terminal device moves at a high speed in a fixed track direction on a high-speed railway track along with a high-speed railway train. It should be noted that the high-speed railway mode is merely a possible implementation of this application. This embodiment of this application may be further applied to a scenario in which the terminal device enters a corresponding mode, for example, an expressway or a road mode, when the terminal device travels on an expressway, a common road, a subway track, or another fixed path along with means of transportation such as a vehicle. A mode in which the terminal device is in when specifically performing S101 is not limited in this application.

Optionally, the terminal device may activate the high-speed railway mode based on an indication of a user, or the terminal device may detect and switch the terminal device from a non-high-speed railway mode to the high-speed railway mode. For example, the terminal device may determine, based on that a location of a base station/cell currently accessed by the terminal device is located along a high-speed railway station/high-speed railway track, to switch to the high-speed railway mode. Alternatively, the terminal device may determine, based on that a location of a base station/cell through which the terminal device passes in a past period of time is located along a high-speed railway track, to switch to the high-speed railway mode. Alternatively, the terminal device may determine, by using a sensor to determine that an acceleration or a moving speed exceeds a threshold, indicating that the terminal device moves along a high-speed railway train, to switch to the high-speed railway mode. Alternatively, the terminal device may further obtain travel information of a user who uses the terminal device (for example, the user purchases a high-speed railway ticket from Beijing to Shanghai at 16:00), to determine that the terminal device is switched to the high-speed railway mode after 16:00.

Specifically, in this embodiment, the second indication information sent by the terminal device to the network device may be used to indicate the information about the operator to which the SIM cards of the terminal device belong. For example, the second indication information may be information about an operator of a base station/cell currently connected to the terminal device, for example, a public land mobile network (Public Land Mobile Network, PLMN) of the operator. In this case, information about the first SIM card may be denoted as a PLMN 1, and information about the second SIM card may be denoted as a PLMN 2. Further, the information about the SIM card may specifically include a cell identity (cell ID) of a base station/cell, it is denoted that the first SIM card provided by an operator X and the second SIM card provided by an operator Y are disposed in the terminal device, an identifier code or an identifier of a base station accessed by the terminal device by using the first SIM card is denoted as a cell ID 1, and an identifier of a base station accessed by the terminal device by using the second SIM card is denoted as a cell ID 2. Because operators of the first SIM card and the second SIM card are different, the terminal device accesses different base stations by using the two SIM cards. Therefore, the operator X that provides the base station can be determined based on the cell ID 1, and the operator Y that provides the base station can be determined based on the cell ID 2. In this case, in S101, the terminal device may send the cell ID 1 and the cell ID 2 to the network device, so that the network device can determine, based on the second indication information, namely, the cell ID 1 and the cell ID 2, that operators corresponding to the two SIM cards disposed in the terminal device are the operator X and the operator Y. For another example, in S101, the terminal device may further directly send, to the network device, information X and information about the operator X corresponding to the first SIM card and the operator Y corresponding to the second SIM card, so that the network device can directly determine that operators corresponding to the two SIM cards disposed in the terminal device are the operator X and the operator Y For still another example, in S101, the terminal device may further send all or some information of a card number of the first SIM card and a card number of the second SIM card to the network device as the second indication information, so that the network device can directly determine that operators corresponding to the two SIM cards disposed in the terminal device are the operator X and the operator Y.

S101 is corresponding to the application scenario in FIG. 4. In a state shown in FIG. 4 (in coverage of a cell 40 and a cell 50), the second indication information sent by the terminal device 3 to the network device 6 may include a cell ID 1 of the cell 40 provided by the operator X that the terminal device 3 currently accesses by using the first SIM card and a cell ID 2 of the cell 50 provided by the operator Y that the terminal device 3 currently accesses by using the second SIM card. Optionally, the terminal device 3 may send the second indication information to the network device 6 by using the currently accessed cell 40 or cell 50, or the terminal device 3 may directly or indirectly send, to the network device 6 in another manner, the information about the two SIM cards disposed in the terminal device. This is not limited in this application.

S102: The network device sends network status information of a plurality of operators in a target section to the terminal device.

Specifically, after receiving the second indication information in S101, the network device may determine two operators to which the two SIM cards disposed in the terminal device respectively belong. Then, the network device may send, to the terminal device in S102, network status information of the SIM cards that are of the two operators and that are used by the terminal device in the target section.

The target section is an area through which the terminal device does not pass and is to pass after receiving the network status information of the plurality of operators that is sent by the network device. Corresponding to the scenario in FIG. 4, the terminal device 3 sends, in the state shown in FIG. 4, the second indication information to the network device 6 in S101, and receives, in S102, the network status information of the plurality of operators that is sent by the network device. A moment at which the terminal device completes S101 and S102 is recorded as a current moment, the target section is a section A-B through which the terminal device is to pass after the current moment. Optionally, in the example shown in FIG. 4, the terminal device is currently located in the coverage areas of the cell 40 and the cell 50, and after moving out of the coverage areas of the cell 40 and the cell 50, the terminal device reaches coverage areas of a cell 41 and a cell 51 in the target section A-B. In another possible implementation, there may be one or more cells between (the cell 40 and the cell 50) and (the cell 41 and the cell 51). In other words, a location at which the terminal device completes S101 and S102 at a current moment may be further at a specific distance from the target section, and a specific value of the distance is not limited.

The scenario shown in FIG. 4 is used as an example. The network device 6 may send, to the terminal device 3 in S102, network status information of an operator in the target section A-B through which the terminal device 3 is about to pass when the terminal device 3 moves on the track 2 along the train 1. The sent network status information may be specifically cell IDs (cell IDs) of cells 41 to 44 that are covered by a network of the operator X, and cell IDs (cell IDs) of cells 51 to 53 that are covered by a network of the operator Y. In this case, the network status information that is in the target section A-B and that is sent by the network device to the terminal device may be specifically represented as "{[(cell 41 ID, PLMN 1), (cell 45 ID, PLMN 1)], (cell 42 ID, PLMN 1), (cell 43 ID, PLMN 1), (cell 44 ID, PLMN 1)}, {(cell 51 ID, PLMN 2), (cell 52 ID, PLMN 2), (cell 53 ID, PLMN 2)}".

Alternatively, the network status information of the operator in the target section A-B may be represented in a table form shown in Table 1.

TABLE 1

| PLMN 1 (Operator X) | Cell 41 ID | Cell 42 ID | Cell 43 ID | Cell 44 ID |
|---|---|---|---|---|
| | Cell 45 ID | | | |
| PLMN 2 (Operator Y) | Cell 51 ID | Cell 52 ID | | Cell 53 ID |

Figure 6:
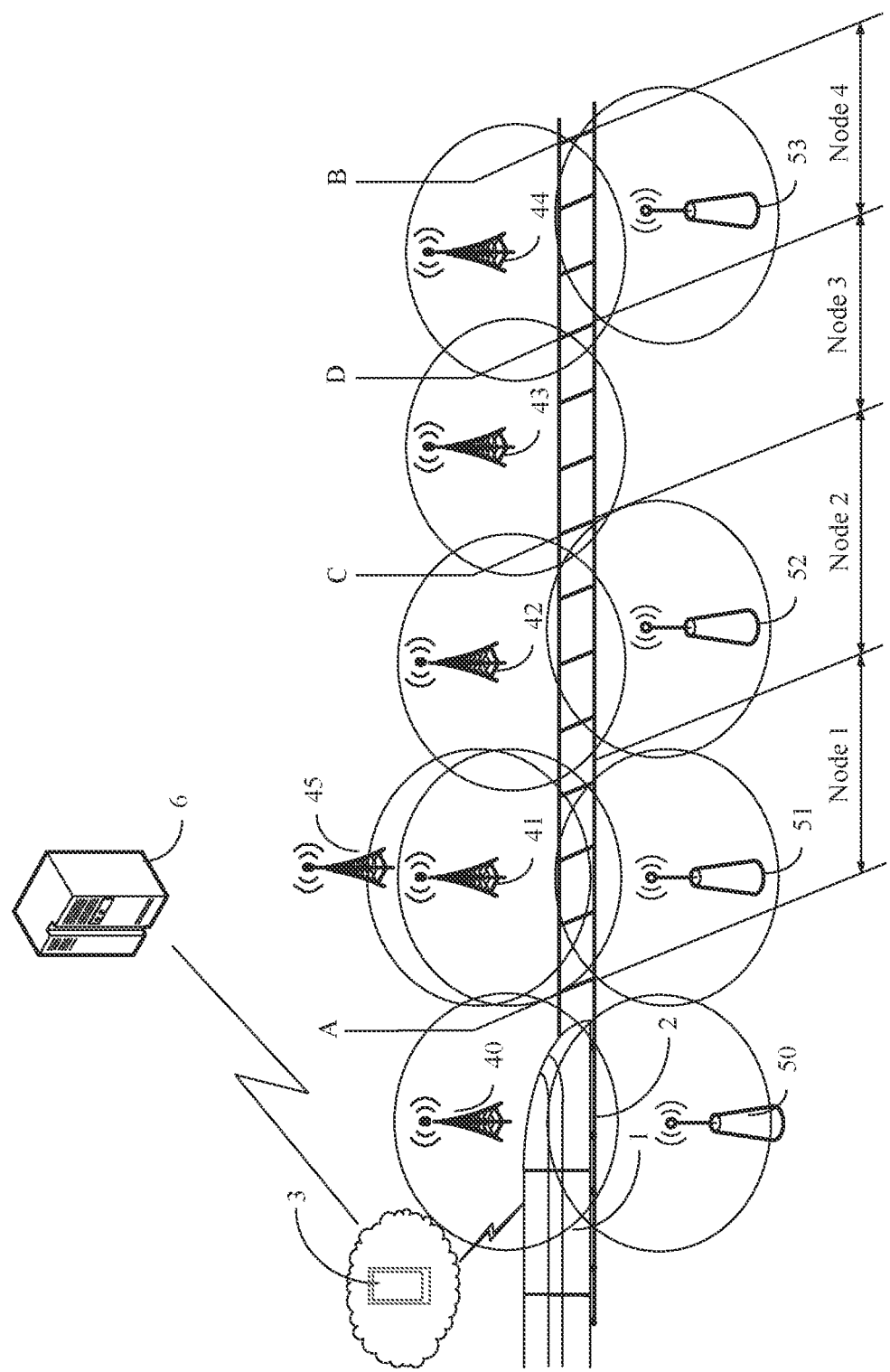
FIG. 6 is a schematic diagram of another embodiment of a scenario to which this application is applied.

More information can be represented in the table form shown in Table 1. For example, the cell 41 and the cell 45 may be two different cells provided by an operator at a same location of coverage on the track. Distribution of the cells is shown in FIG. 6. FIG. 6 is a schematic diagram of another embodiment of a scenario to which this application is applied. The cell 41 and the cell 45 at the same location may be provided by the same operator X. In an actual application, because a coverage area of a single cell is small, an operator may use a "cell combination" manner to combine a plurality of cells into a cell with a large coverage area. For example, a plurality of cells in which RRUs on a pole use a same frequency f1 are combined into a large cell cell 41, and cells in which RRUs use a same frequency f2 are combined into a large cell cell 45. Signal coverage areas provided by the cell 41 and the cell 45 are mostly overlapped in geographical location.

In addition, as shown in Table 1, a geographical location corresponding to a cell or a base station bearing a cell may be represented. For example, a distance that a train travels on a preset path, namely, a track, may be divided into different nodes, and a length that corresponds to each node and that is of the preset path for the train may be about 4 kilometers. In this case, the network device may determine four nodes each time as the target section A-B shown in FIG. 6, and the four nodes are denoted as nodes 1 to 4. The target section may include a larger quantity of nodes (for example, 50 nodes, and in this case, a length of the track corresponding to the target section may be 200 kilometers). For ease of description, in this embodiment, an example in which the target section includes four nodes is used, instead of limiting the length and the quantity of the nodes. Therefore, it may be determined, based on the network status information shown in Table 1, that at the nodes 1 to 4, the terminal device may be sequentially connected to the cell 41/cell 45, the cell 42, the cell 43, and the cell 44 that are provided by the operator X. However, the cells 51 to 53 provided by the operator Y are not covered at a node 3. Consequently, the terminal device cannot use the second SIM card corresponding to the operator Y for communication at the node 3 in the target section A-B.

Optionally, in S102, there are two possible movement directions when the terminal device runs along the train on the rail. Therefore, before determining the network status information, the network device may further first determine a target section based on a movement direction of the terminal device. For example, in the example shown in FIG. 6, the terminal device moves rightwards (denoted as a positive direction) along with the train that travels from left to right. On the contrary, the terminal device may also move leftwards (denoted as a reverse direction) along with the train that travels from right to left. Therefore, if the network device can determine the movement direction of the terminal device, the network device may determine the section A-B in front of the movement direction of the terminal device in the figure as the target section. In addition, when determining the target section, the network device may use a specific quantity of nodes in front of the terminal device as the target section. For example, N continuous nodes in front of the movement direction of the terminal device are used as the target section, where N may be a positive integer such as 50 or 100, to determine the network status information in the target section based on the preset path, and send the network status information in the target section to the terminal device. For example, in the scenario shown in FIG. 6, after determining that the direction in which the terminal device 3 runs along with the train 1 is the rightward positive direction in the figure, the network device uses 50 nodes in the positive direction as the target section, and further determines the network status information in the target section. In this case, the network device sends, to the terminal device 3, the network status information between the target section A-B that is to be pass through and that is in the positive direction of the terminal device. Alternatively, a section between two target locations in front of the movement direction of the terminal device may be directly used as the target section A-B. The target location may be a site that can identify a location, such as a station, a factory, or a building.

In a specific embodiment, the network device may determine the movement direction of the terminal device based on a handover record of the terminal device. For example, in the scenario shown in FIG. 6, when the terminal device is in the coverage areas of the cell 40 and the cell 50 at a current moment, after sending the second indication information to the network device, the network device determines, based on a cell handover record of the terminal device before the current moment, that the terminal device moves in the positive direction from left to right. Alternatively, the terminal device may determine the movement direction of the terminal device based on the handover record or based on a sensor such as a positioning module, and then carry the movement direction in the first information sent to the network device in S101, so that the network device can determine the movement direction of the terminal device based on the first information.

Optionally, in S102, if the network device cannot determine the movement direction of the terminal device, the network device may use a specific quantity of nodes at two sides of a node at which the terminal device 3 is currently located in FIG. 6, for example, a total of 100 nodes, namely, 50 nodes on the left of the cell 40 and the cell 50, and 50 nodes on the right of the cell 40 and the cell 50, as the target section, and send the network status information in the target section to the terminal device. Alternatively, a section between two stations corresponding to a node at which the network device is currently located is used as the target section. For example, if the network device determines that a base station at which the terminal device is currently located is located between a station P and a station Q, the network device may use a section between the station P and the station Q as the target section, and send the network status information between the target section P-Q to the terminal device 3.

S103: Before entering the target section, the terminal device determines, from the two disposed SIM cards based on the network status information in the target section, a target SIM card used when the terminal device passes through the target section.

Specifically, the terminal device determines, from the first SIM card and the second SIM card, one SIM card as the target SIM card based on the network status information in the target section received in S102, so that the terminal device can use the target SIM card as a primary card of a voice and/or data service for communication when passing through the target section. To determine the target SIM card, the terminal device may further compare, based on the network status information, communication quality when the terminal device in the target section performs communication by using the first SIM card with performance when the terminal device performs communication by using the second SIM card, to determine, from the two SIM cards disposed in the terminal device, a SIM card with better communication performance as the target SIM card.

In a specific implementation, the terminal device may perform, in a quantized weighting manner by using the received network status information in the target section, quantized evaluation on coverage areas of base stations or cells that are set by operators corresponding to the two SIM cards and that are in the target section. A larger coverage area indicates a larger weighted value, indicating better communication performance of a SIM card. The scenario shown in FIG. 6 is used as an example. Table 2 shows a manner of quantizing the coverage areas of the base stations that are deployed by the operators corresponding to the two SIM cards of the terminal device and that are in the target section A-B.

TABLE 2

|  | Node 1 | Node 2 | Node 3 | Node 4 |
|---|---|---|---|---|
| PLMN 1 (Operator X) | Cell 41 ID Cell 45 ID | Cell 42 ID | Cell 44 ID | Cell 44 ID |
| PLMN 1 Weight value | 1.1 | 1 | 1 | 1 |
| PLMN 2 (Operator Y) | Cell 51 ID | Cell 52 ID |  | Cell 53 ID |
| PLMN 2 Weight value | 1 | 1 |  | 1 |

For the PLMN 1 provided by the operator X, the terminal device may access the cell 41 or the cell 45 at the node 1 by using the first SIM card. Therefore, a weight value 1+0.1=1.1 may be assigned (if the node includes more base stations or cells, a value 0.1 is assigned to each of other base stations or cells except the first base station or cell is assigned with a weight value 1). The terminal device may be connected to one base station or cell at the nodes 2 to 4, and a value 1 may be assigned. Similarly, for the PLMN 2 provided by the operator Y, the terminal device may access the cell 51 at the node 1 by using the second SIM card, access the cell 52 at the node 2, and access the cell 53 at the node 4, and a value 1 may be assigned.

Then, weighted values corresponding to the networks of the operators to which the two SIM cards belong in the target section may be calculated according to the following formula 1:

$$W_k = \Sigma_{i=1}^{N} \Sigma_{j=1}^{M_i} a_{i,j,k} \qquad \text{(Formula 1)}.$$

k represents a number of a to-be-calculated PLMN. W1 obtained after a cell of the network of the operator X is weighted based on a coverage area is denoted as a weighted value of the PLMN 1 of the operator X to which the first SIM card belongs, and the obtained weighted value W1 may be used as coverage performance of the network of the operator X in the target section, W2 obtained after a cell of the network of the operator X is weighted based on a coverage area is denoted as a weighted value of the PLMN 2 of the operator Y to which the second SIM card belongs, and the obtained weighted value W2 may be used as coverage performance of the network of the operator Y in the target section. N represents a quantity of nodes in the target section, Mi represents a total quantity of cells on an $i^{th}$ node, and $a_{i,j,k}$ represents a weight of each cell. In correspondence to the weight values in Table 1, when j=1, $a_{i,j,k}$=1, and when j>1, $a_{i,j,k}$=0.1. A weighted value of the PLMN may be provided by a network device of an operator or another vendor.

Finally, through calculation in the formula 1, it may be obtained that the weighted value W1 of network coverage of the network of the operator X to which the first SIM card of the terminal device belongs between the target section A-B is 4.1, and the weighted value W2 of network coverage of the operator Y of the second SIM of the terminal device between the target section A-B is 3. In this case, because W1>W2, it indicates that, between the target section A-B, a network coverage area of the base station set by the operator X is greater than a network coverage area of the base station set by the operator Y When the terminal device passes through the target section A-B, communication can be less interrupted due to a coverage hole when the terminal device uses the first SIM card provided by the operator X to perform communication. Therefore, higher communication quality and better performance are implemented in the target section A-B, and the terminal device may determine the first SIM card as the target SIM card.

It should be noted that the embodiment shown in FIG. 6 is merely an example for description. In a specific implementation, the target section may include 50, 100, or more nodes. The terminal device may calculate weighted values of network coverage of two SIM cards in a target section according to formula 1, and finally determine a SIM card with a larger weighted value as the target SIM card.

Optionally, if the network device cannot determine the movement direction of the terminal device, the network status information sent to the terminal device may be a target section that is constituted by a specific quantity of nodes in two side directions of a node on which the terminal device is currently located, or may be a target section that is constituted by a node between two stations. In this case, in S103, before determining the target SIM card, the terminal device further determines the movement direction of the terminal device based on the handover record of the terminal device, determines, based on the movement direction, a node that is to pass in front of the terminal device as the target section, and determines the target SIM card by using the foregoing formula 1.

S104: Before or when entering the target section, the terminal device switches, based on the target SIM card determined is S103, a SIM card used by the terminal device from the first SIM card to the target SIM card.

It is assumed that before S104, the terminal device uses the first SIM card for communication, and when determining that the target SIM card is different from the first SIM card, the terminal device switches the SIM card used by the terminal device from the first SIM card to the target SIM card before or when entering the target section.

Optionally, when performing SIM card switching, the terminal device may select, without affecting a current service of the terminal device, a node that is covered by networks of both operators corresponding to the two SIM cards. For example, in the example shown in FIG. 6, if the terminal device 3 uses the first SIM card as the primary card for communication before passing through the section A-B, and determines that the target SIM card is the second SIM card, then when arriving at the last node (for example, a node covered by the cell 40 of the operator corresponding to the first SIM card and the cell 50 of the operator corresponding to the second SIM card in the figure) that is covered by the networks of both operators to which the two SIM cards belong and that is in front of the section A-B, the terminal device switches the primary card from the first SIM card to the second SIM card, to switch the target SIM card in advance when the terminal device passes through the target section to the primary card, so as to improve communication quality of the terminal device when the terminal device passes through the target section. In addition, during SIM card switching, communication continuity can be further ensured, and participation of a user can be reduced in an entire switching process, and user experience can also be improved. Optionally, the terminal device may further switch the primary card from the first SIM card to the second SIM card when arriving at the first node (for example, a node covered by the cell 41 of the operator corresponding to the first SIM card and the cell 51 of the operator corresponding to the second SIM card in the figure) that is in the section A-B and that is covered by the networks of both operators to which the two SIM cards belong.

S105: Use the target SIM card for communication in the target section.

Finally, in S105, when passing through the target section, the terminal device uses the target SIM card for communication. For a terminal device that has a dual-card function and whose dual cards belong to different operators, the using the target SIM card for communication may be using the target SIM card disposed in the terminal device as the primary card for communication.

For example, in the scenario shown in FIG. 6, when the terminal device 3 moves along the train 1 on the track 2 at a high speed, and before passing through the target section A-B, the terminal device 3 determines, in S101 to S103, that when the second SIM card is used as the target SIM card for communication in the target section, communication quality is higher. If a user of the terminal device 3 has selected the second SIM card as the primary card of the terminal device 3 for communication before the terminal device 3 reaches the target section A-B, after the terminal device 3 reaches the target section A-B, the second SIM card may be kept as the primary card. However, if a user of the terminal device 3 selects the first SIM card as the primary card of the terminal device 3 for communication before the terminal device 3 reaches the target section A-B, before the terminal device 3 reaches the target section A-B, the primary card needs to be switched from the first SIM card to the second SIM card that serves as the primary card of the terminal device 3 for communication.

Optionally, if the terminal device needs to perform SIM card switching, the terminal device may directly perform the SIM card switching, and a switching process is invisible to the user. Alternatively, the terminal device may further prompt the user to perform SIM card switching, and perform SIM card switching after obtaining an indication of the user.

It may be understood that, in this embodiment, when the terminal device moves in a direction of a track from a city I to a city K continuously along with a train (or when the terminal device is always in the high-speed railway mode), and a target section in switching path information obtained by the terminal device includes only some areas of the track between the city J and the city K, the terminal device may continuously obtain network status information in different target sections from the network device. For example, it is assumed that the track from the city I to the city K may include continuous target section 1, target section 2, . . . , the terminal device obtains network status information in the target section 1 from the network device in S101 to S103, and uses a first target SIM card during passing through the target section 1. When being about to leave the target section 1 (which may be the last one to two nodes in the target section 1, or the last node covered by two operators in the target section 1), the terminal device obtains network status information in the target section 2 from the network device again in S101 to S103, determines a second target SIM card used during passing through the target section 2, and then switches to the second target SIM card before passing through the target section 2.

In conclusion, according to the communication method provided in this embodiment, before passing through the target section, the terminal device having the dual-SIM function obtains, from the network device, the network status information in the target section that is to be passed through, and determines, in advance based on the coverage areas or coverage performance of the operators to which the two SIM cards belong in the network status information, that when passing through the target section, the terminal device performs communication by using the target SIM card that has better communication performance in the target section, namely, higher communication quality or better network coverage performance and that is in the two SIM cards disposed in the terminal device. Subsequently, before or when the terminal device actually passes through the target section, the terminal device can switch to the target SBA card in advance for communication. In this way, a case such as a communication interruption caused by using another SIM card in the target section can be avoided, and higher communication quality is obtained when the terminal device actually passes through the target section, to reduce a communication interruption that may be caused by a coverage hole and that may be encountered by the terminal device, improve communication efficiency of the terminal device, and improve user experience. In addition, in this embodiment, because the terminal device may determine the target SIM card by using the network status information in the target section, the network device may not need to send information to the terminal device to indicate the target SIM card, to reduce exchange of related indication information between the network device and the terminal device and a definition of the indication information, and improve communication efficiency between the terminal device and the network device.

Embodiment 2

In the foregoing embodiment, the terminal device may measure communication quality of a used SIM card by using the coverage area of the base station or the cell deployed by the operator. In another implementation, a terminal device may further measure communication quality of a SIM card based on communication quality of a base station/cell connected to the SIM card in a target section. In this case, cell information sent by a network device to the terminal device includes a cell ID of the cell and a communication quality parameter of each cell.

Specifically, for this embodiment, refer to the procedure shown in FIG. 5. This embodiment is used as an equivalent replacement for S102 and S103 in the embodiment shown in FIG. 5. In this case, the network status information sent by the network device to the terminal device in S102 further includes a communication quality parameter of each base station or cell in addition to the cell II) of the cell covered by an operator. The communication quality parameter is used to indicate communication performance of each base station. For example, the communication performance of the base station may be represented by one or more communication quality parameters of a call drop rate, a network disconnection rate, and an RRC re-establishment rate at a non-handover moment. After these working parameters are normalized, a value between [0,1] is obtained as a communication quality parameter. A larger value of the communication quality parameter indicates better communication performance of the base station or the cell, and a smaller value indicates poorer communication performance of the base station. In this case, the network status information that is of the target section and that is sent by the network device to the terminal device may be shown in Table 3.

TABLE 3

| PLMN 1 (Operator X) | (Cell 41 ID, 1) | (Cell 42 ID, 1) | (Cell 44 ID, 0.7) | (Cell 44 ID, 0.9) |
|---|---|---|---|---|
| | (Cell 45 ID, 0.8) | | | |
| PLMN 2 (Operator Y) | (Cell 51 ID, 1) | (Cell 52 ID, 1) | | (Cell 53 ID, 0.6) |

Similarly, the scenario shown in FIG. 4 is used as an example. The network status information that is in the target section and that is sent by the network device to the terminal device further carries a communication quality parameter of each base station or cell.

In this case, in S103, the terminal device may determine a target SIM card based on a weighted result after weighting respective communication quality parameters of the two SIM cards based on the following formula 2:

$$W_k = \Sigma_{i=1}^{N} \Sigma_{j=1}^{M_i} a_{(i,j,k)} \qquad \text{(Formula 2)}.$$

k represents a number of a to-be-calculated PLMN, W1 is denoted as a weighted value of the PLMN 1 of the operator X of the first SIM card, and W2 is denoted as a weighted value of the PLMN 2 of the operator Y of the second SIM card. N indicates a quantity of nodes in the target section, Mi indicates a total quantity of cells on an $i^{th}$ node, and $a_{\_(i, j, k)}$ indicates a communication quality parameter of each cell in Table 3. A weighted value of a PLMN may be provided by a device of an operator or another vendor.

In this case, through calculation in the formula 2, it may be obtained that the weighted value W1 of the communication quality parameter of the network of the operator of the first SIM card of the terminal device between the target section is 1+0.8+1+0.7+0.9=4.4, and the weighted value W2 of the communication quality parameter of the network of the operator of the second SIM card between the target section is 1+1+0.6=2.6. In this case, because W1>W2, it indicates that overall communication performance of a base station or cell connected to the terminal device by using the first SIM card between the target section A-B is better than overall communication performance of a base station or cell connected to the terminal device by using the second SIM card. Therefore, when the terminal device passes through the target section A-B, better communication performance can be achieved when the terminal device performs communication by using the first SIM card provided by the operator X, so that higher communication quality is implemented in the target section A-B. Therefore, the terminal device may determine the first SIM card as the target SIM card.

In conclusion, this embodiment provides another method for determining, based on communication performance of a base station or a cell, communication performance of a SIM card used by a terminal device in the embodiment shown in FIG. 5. Similarly, before passing through the target section, the terminal device can determine, in advance based on the network status information that is in the target section and that is sent by the network device, the target SIM card that has better communication performance and that is used when the terminal device passes through the target section. Subsequently, when the terminal device actually passes through the target section, higher communication quality can be obtained by using the target SIM card. Therefore, a communication interruption that may be caused by a coverage hole and that may be encountered when the terminal device uses another SIM card in the target section is reduced, to improve communication efficiency of the terminal device and improve user experience.

Embodiment 3

In Embodiment 1 and Embodiment 2, to obtain the network status information in the target section from the network device, the terminal device needs to send the second indication information to the network device, to indicate the information about the two SIM cards disposed in the terminal device (namely, S101 shown in FIG. 5). However, an amount of information exchanged between the terminal device and the network device increases.

Therefore, in another Embodiment 3 of this application, the network device may "actively" send the network status information in the target section to the terminal device without sending the second indication information to the network device by the terminal device. In other words, in Embodiment 3, only S102 to S105 shown in FIG. 5 are included. In this case, based on whether a location of the terminal device and information about a SIM card can be determined, the following several specific implementations may be included.

In a first implementation, if the network device cannot determine the location (a track on which the terminal device is located) of the terminal device and cannot determine the information about the SIM card of the terminal device, the network device may send preset path information of all operators stored in the network device to the terminal device. The terminal device stores the preset path information, obtains the preset path information from storage space subsequently as required, determines network status information corresponding to the target section, and then determines a target SIM card from two SIM cards based on the network status information of the target section. The preset path information includes network status information of all at least two SIM cards disposed in the terminal device on at least one preset path, the at least one preset path includes a first preset path on which the terminal device is currently located, and the first preset path includes the target section. For example, the preset path information may include a total of nine pieces of network status information that are on three preset paths, namely, a track 1, a track 2, and a track 3 and that are respectively from an operator P, an operator Q, and an operator L. In this case, after the terminal device activates a high-speed railway mode, or determines to enter a high-speed railway mode, or before the terminal device activates a high-speed railway mode, the network device may send, to the terminal device in S102, the preset path information that is stored by the network device and that includes the nine pieces of network status information. Therefore, after receiving the nine preset paths, the terminal device first selects, from the preset path information based on the track on which the terminal device is located and the information about the disposed SIM card and with reference to a current location and a driving direction, network status information in a target section through which the terminal device is to pass, and then determines the target SIM card from the two SIM cards according to the method described in S103 in the foregoing embodiment.

In a second implementation, if the network device can determine the information about the SIM card of the terminal device, but cannot determine the location (a track on which the terminal device is located) of the terminal device, the network device may send, to the terminal device, network status information that corresponds to the SIM card of the terminal device and that is in preset path information stored in the network device. Similarly, for example, the preset path information stored in the network device includes a total of nine pieces of network status information that are on three preset paths, namely, a track 1, a track 2, and a track 3 and that are respectively from an operator P, an operator Q, and an operator L. After determining that the terminal device uses SIM cards of the operator P and the operator Q, the network device may send, to the terminal device, a total of six pieces of network status information that are on the track 1, the track 2, and the track 3 and that are from the operator P and the operator Q, and the terminal device also determines a target SIM card according to S103.

In a third implementation, if the network device can determine a track on which the terminal device is located, but cannot determine the information about the SIM card of the terminal device, the network device may send network status information of all operators on the track on which the terminal device is located to the terminal device. Similarly, for example, preset path information stored in the network device includes a total of nine pieces of network status information that are on three paths, namely, a track 1, a track 2, and a track 3 and that are respectively from an operator P, an operator Q, and an operator L, and the network device may determine that a current location of the terminal device is on the track 1. In this case, the network device may send, to the terminal device, three pieces of network status information that are on the track 1 and that are from the operator P, the operator Q, and the operator L, and the terminal device also determines cell information of the target section according to S103 and S104.

In a fourth implementation, if the network device can determine the location (a track on which the terminal device is located) of the terminal device, and can determine the information about the SIM card of the terminal device, the network device may directly send the network status information in the target section to the terminal device, and the terminal device determines a target SIM card according to S103.

Therefore, in this embodiment, when the terminal device may not perform S101, the network device sends the preset path information or network status information of some target sections in the preset path information to the terminal device, to reduce information interaction between the terminal device and the network device, improve autonomy when the network device sends the network status information in the target section to the terminal device, and improve communication efficiency between the terminal device and the network device.

Embodiment 4

This embodiment is applied to Embodiment 3. When determining the target SIM card, the terminal device may not send the second indication information to the network device, to indicate information about an operator of a SIM card disposed in the terminal device. In this case, the network device may store the information about the operator of the SIM card that is sent by the terminal device to the network device during registration or in the high-speed railway mode, so that the information about the SIM card of the terminal device can be determined when Embodiment 3 is performed.

For example, after a user of the terminal device disposes two SIM cards and enables the terminal device to access a network for communication by using the SIM card, the network device may record information about operators of the two SIM cards used by the terminal device. The network device may obtain and record the information about the operator of the SIM card of the terminal device in an initialization phase such as power-on or restart of the terminal device. Alternatively, after the terminal device activates the high-speed railway mode or determines to enter the high-speed railway mode, the network device may obtain the information about the operators of the two SIM cards of the terminal device.

Embodiment 5

In Embodiment 1 to Embodiment 4, after the terminal device sends the information about the SIM card disposed in the terminal device to the network device, the network device sends the network status information in the target section to the terminal device, and the terminal device determines, based on the network status information in the target section, the target SIM card used in the target section. In another possible implementation, the network device may directly send the target SIM card to the terminal device after directly determining the target SIM card used by the terminal device in the target section, so that a calculation amount required by the terminal device can be reduced.

Figure 7:
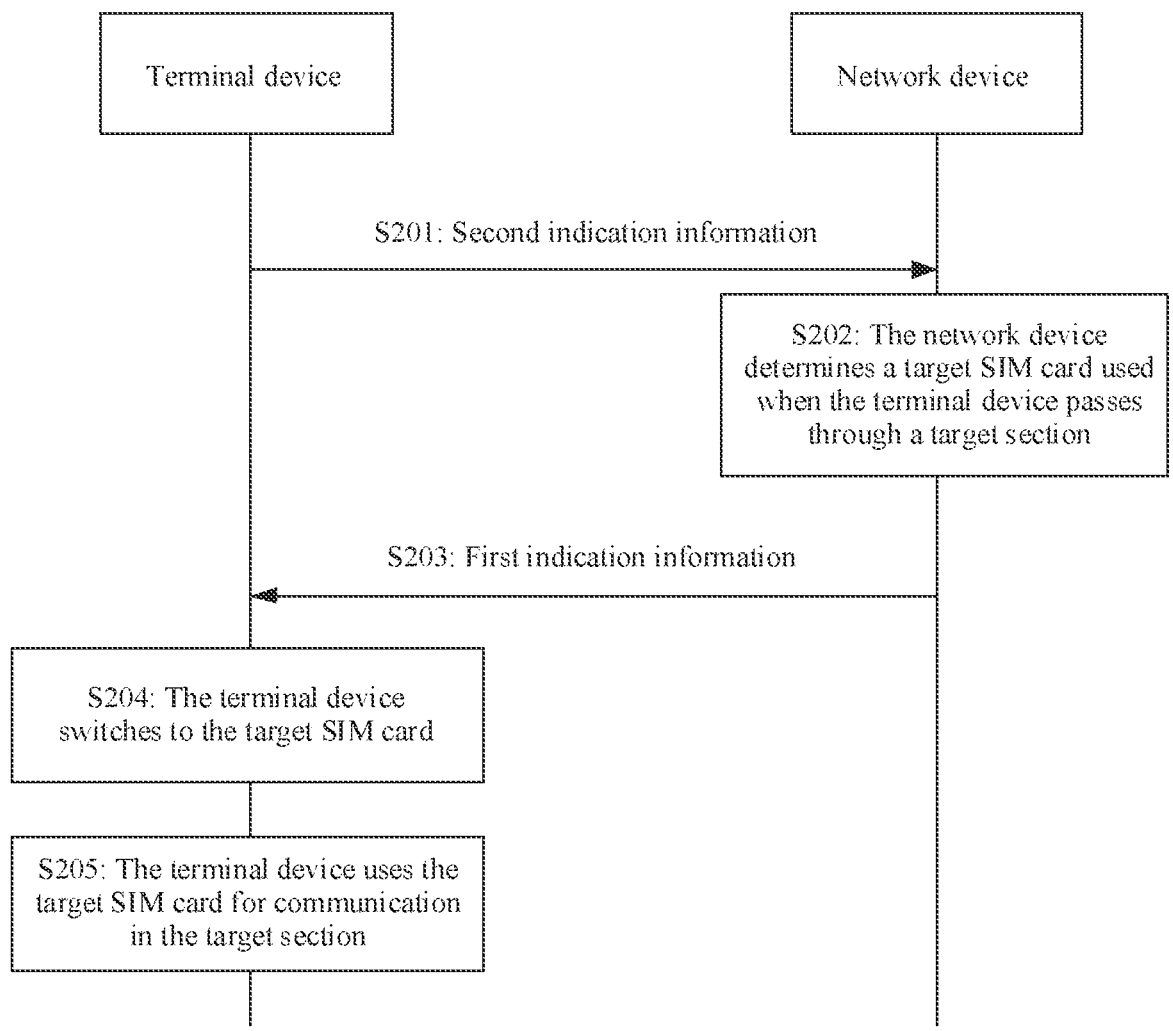
FIG. 7 is a schematic flowchart of another embodiment of a communication method according to this application.

For example, FIG. 7 is a schematic flowchart of another embodiment of a communication method according to this application. The method shown in FIG. 7 may also be applied to the scenario shown in FIG. 4. The network device 6 determines the target SIM card used when the terminal device 3 passes through the target section A-B. Specifically, the communication method provided in this embodiment includes the following steps.

S201: A terminal device sends second indication information to a network device, where the second indication information is used to indicate information about an operator of two SIM cards disposed in the terminal device.

A specific implementation of S201 shown in FIG. 7 is the same as that of S101 shown in FIG. 5, and details are not described again.

S202: The network device determines a target SIM card used when the terminal device passes through a target section.

Specifically, in S202 in this embodiment, after receiving the second indication information sent by the terminal device, the network device may determine, from a first SIM card and a second SIM card used by the terminal device, one SIM card as the target SIM card used when the terminal device passes through the target section.

In an implementation, after receiving the second indication information, the network device may determine two operators respectively corresponding to the two SIM cards disposed in the terminal device, and further determine network status information that is of the SIM cards of the two operators used by the terminal device in the target section. Then, after weight values of the two SIM cards used by the terminal device are calculated according to Formula 1 or Formula 2, a SIM card corresponding to a network of an operator with a larger weight value is determined as the target SIM card. In other words, in S202, the operation of determining the target SIM card by the terminal device based on the network status information in the target section in S103 in the embodiment shown in FIG. 5 is performed by the network device instead of the terminal device, to reduce a calculation amount of the terminal device. A specific calculation principle and manner thereof are the same, and details are not described again.

Optionally, before determining the target SIM card, the network device may further determine a movement direction of the terminal device, to determine a target section in front of the movement direction of the terminal device. The network device may determine, based on information that is reported by the terminal device and that is about several, for example, five base stations or cells to which the terminal device is handed over in a past period of time, the movement direction of the terminal device along a train on a track.

S203: The network device sends first indication information to the terminal device, where the first indication information is used to indicate the target SIM card used when the terminal device passes through the target section.

Then, after determining the target SIM card in S202, the network device indicates the determined target SIM card to the terminal device in S203. The first indication information may be specifically indicated by using a simple target bit whose value is "0" or "1". For example, when the target bit is "0", it indicates that the first SIM card of the terminal device is the target SIM card, and when the target bit is "1", it indicates that the second SIM card of the terminal device is the target SIM card.

S204: Before or when entering the target section, the terminal device switches, based on the target SIM card determined in S203, a SIM card used by the terminal device from the first SIM card to the target SIM card.

S205: The terminal device uses the target SIM card for communication in the target section.

Specific implementations of S204 and S205 shown in FIG. 7 are the same as those of S104 and S105 shown in FIG. 5, and details are not described again. In conclusion, according to the communication method provided in this embodiment, when a dual-card function is supported and two SIM cards belong to different operators, before a terminal device passes through a target section, a network device can determine, in advance based on information about the two SIM cards disposed in the terminal device, that when the terminal device passes through the target section, higher communication quality can be obtained by using a target SIM card in the two SIM cards disposed in the terminal device for communication, and indicate the terminal device to use the target SIM card when the terminal device passes through the target section. Therefore, when the terminal device actually passes through the target section subsequently, higher communication quality may be obtained by using the target SIM card based on an indication of the network device, thereby reducing a communication interruption that may be caused by a coverage hole and that may be encountered by the terminal device, improving communication efficiency of the terminal device, and improving user experience. In addition, in this application, the terminal device does not need to determine the target SIM card through calculation, and only needs to determine the target SIM card based on the instruction of the network device, the calculation amount of the terminal device is further reduced, computing resources of the terminal device are saved, and storage space required by the terminal device for storing path switching information is reduced. Therefore, power consumption of the terminal device in a high-speed railway mode is reduced, and user experience can be improved.

Embodiment 6

In another possible implementation of S202 in Embodiment 5, a network device side may prestore priority orders of all SIM cards in different sections. The priority may be that a SIM card with higher communication quality has a higher priority, and a SIM card with lower communication quality has a lower priority. For example, it is assumed that a track 1 includes cell coverage of three operators: an operator P, an operator Q, and an operator L. In this case, the network device may store a priority order in each section in a unit of a section (a length of each section is the same as that of a target section), for example, section 1-"PQL", section 2-"QLP", and the like. In this case, when the network device determines the target SIM card of the terminal device in S202, the network device may determine, based on the section 2 in which the terminal device is currently located, that SIM cards used by the terminal device belong to the operator L and the operator P, and the priority order "QLP" corresponding to the section 2, that a SIM card that corresponds to the operator L and that has a higher priority as the target SIM card.

Optionally, the priority order may be stored in a form of a table. The priority order may be preset. Alternatively, the priority order may be obtained after a test person takes a train and performs actual measurement by using a terminal device. Alternatively, the priority order may be calculated by another device in a target section and sent to a network device for storage.

Embodiment 7

In another possible implementation of the embodiment shown in FIG. 7, based on S201 to S203 in the foregoing embodiment, a network device may determine a target SIM card used by a terminal device in a target section. It may be understood that after a movement direction of the terminal device is determined, because a track is fixed, a section through which the terminal device passes when moving between a station P and a station Q is also fixed. Therefore, in the another implementation of the embodiment shown in FIG. 7, after the network device receives, in S201, second indication information sent by the terminal device, the network device may determine, in S202, a target SIM card used in each of a plurality of target sections through Which the terminal device is to pass, and send, in S203, the plurality of target sections and the target SIM cards in the plurality of target sections to the terminal device sequentially. It may be understood that the target SIM card in each target section is one SIM card of two SIM cards in the terminal device. For the terminal device, in S204, when the terminal device passes through the plurality of target sections continuously subsequently, the terminal device may use, based on an instruction of the network device, the target SIM card corresponding to each target section for communication.

Therefore, according to the communication method provided in this embodiment, the network device sends, to the terminal device together in advance, the target SIM cards used in each of the plurality of target sections through which the terminal device passes, so that the terminal device and the network device can determine the target SIM cards in the plurality of target sections through this information exchange. If the terminal device is still in a high-speed railway mode, the terminal device may perform this application again after passing through the plurality of target sections, to reduce information exchange between the terminal device and the network device and improve communication efficiency.

Embodiment 8

In still another possible implementation of the embodiment of FIG. 7, a terminal device may further perform, in an initialization phase such as power-on, restart, or software upgrade, after obtaining information about two SIM cards disposed in the terminal device, S201, to send second indication information to a network device in advance, so as to indicate information about operators of the two SIM cards. The network device may store the information about the two SIM cards of the terminal device in a storage device of the terminal device.

Then, after the network device determines that the terminal device enters a high-speed railway mode, in S202, the network device determines a target SIM card in a target section based on the stored information about the SIM card of the terminal device, and sends the target SIM card to the terminal device in S203. In this case, when subsequently determining the target SIM card, the network device may no longer receive the information that is about the operator of the SIM card and that is sent by the terminal device, but more quickly obtain the information about the operator of the SIM card of the terminal device from the storage device, can determine, based on the information about the SIM card, the target SIM card corresponding to the terminal device in the target section as soon as possible, and send indication information as soon as possible, to reduce duration for determining the target SIM card by the network de-vice, and improve efficiency.

Embodiment 9

Further, in the foregoing embodiments shown in FIG. 5 and FIG. 7, the terminal device uses the target SIM card for communication in the target section in both S104 and S204. If a SIM card used by the terminal device before the target section is different from the target SIM card, there is a SIM card switching scenario. In an ideal situation, the steps shown in FIG. 5 to FIG. 7 are invisible to a user, that is, even if the SIM card used by the terminal device before the target section is different from the target SIM card, for the terminal device used by a user, a disposed SIM card is used for communication before the target section, and the target SIM card is used for communication in the target section. The user may always use the terminal device for communication without manually switching the SIM card, and a scenario in which the user switches the SIM card after communication of the terminal device using a SIM card with a poorer signal is interrupted does not occur.

Figure 8:
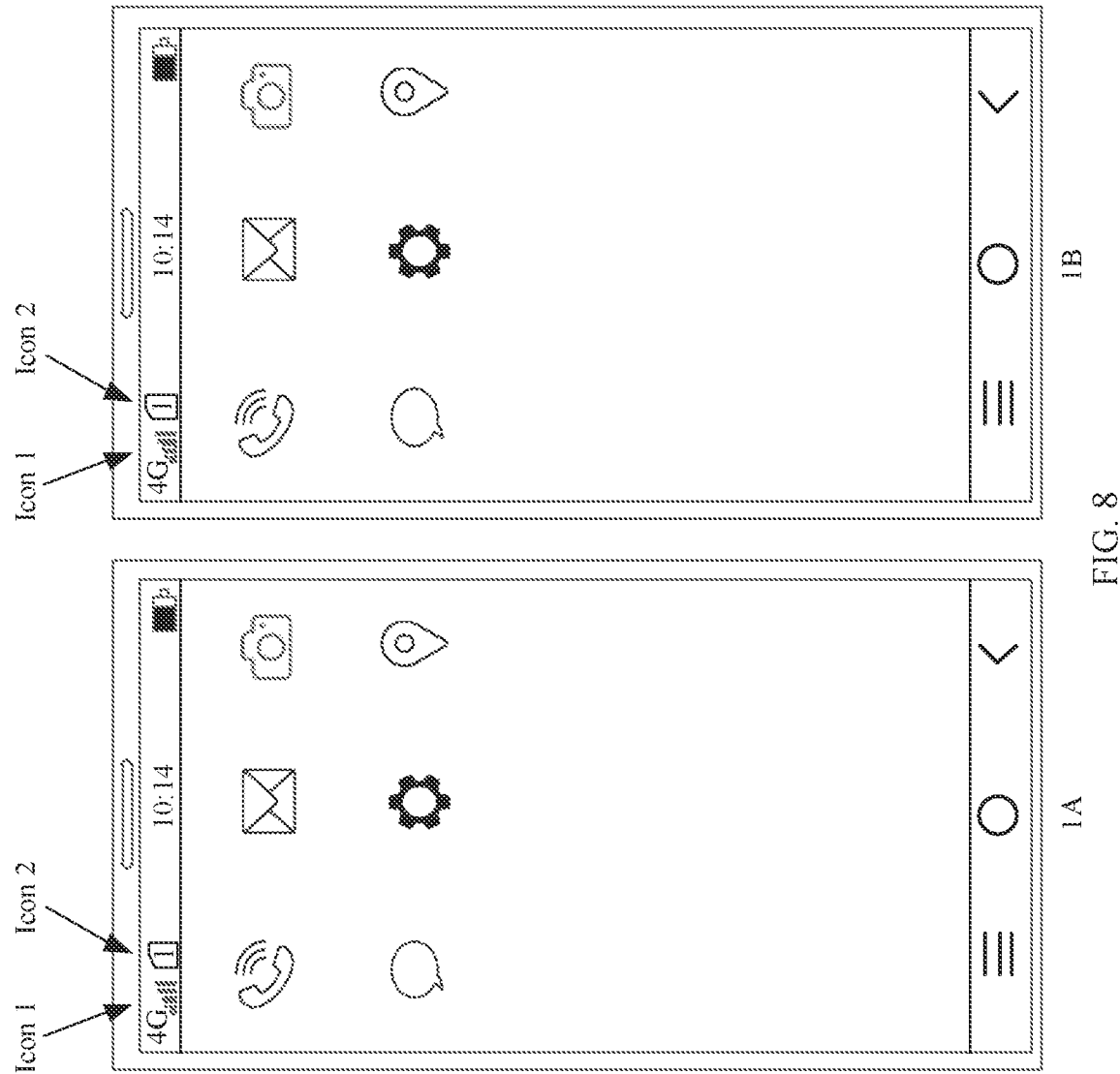
FIG. 8 is a schematic diagram of a display interface of a terminal device.

In a possible implementation, FIG. 8 is a schematic diagram of a display interface of a terminal device. It is assumed that a first SIM card supporting a 4G standard and a second SIM card supporting a 5G standard are disposed in the terminal device, and before the terminal device passes through a target section, a user selects the first SIM card as a primary card for communication. In a display interface 1A displayed by the display apparatus, an icon 1 may be used to display signal strength of a current SIM card, and "1" in an icon 2 is used to indicate that the first SIM card selected by the user serves as the primary card. In this case, if the terminal device determines, based on the embodiment shown in FIG. 5 or FIG. 7, that the target SIM card is the first SIM card, that is, a currently used. SIM card is the same as the target SIM card, the terminal device does not need to switch the SIM card when passing through the target section, and keeps using the first SIM card as the primary card. Therefore, a display interface 1B shown in FIG. 8 is a display interface when the terminal device passes through the target section. It can be learned that the display interface 1B does not change compared with the display interface 1A, the user also does not perceive that the terminal device actually performs a process of determining the target SIM card.

Figure 9:
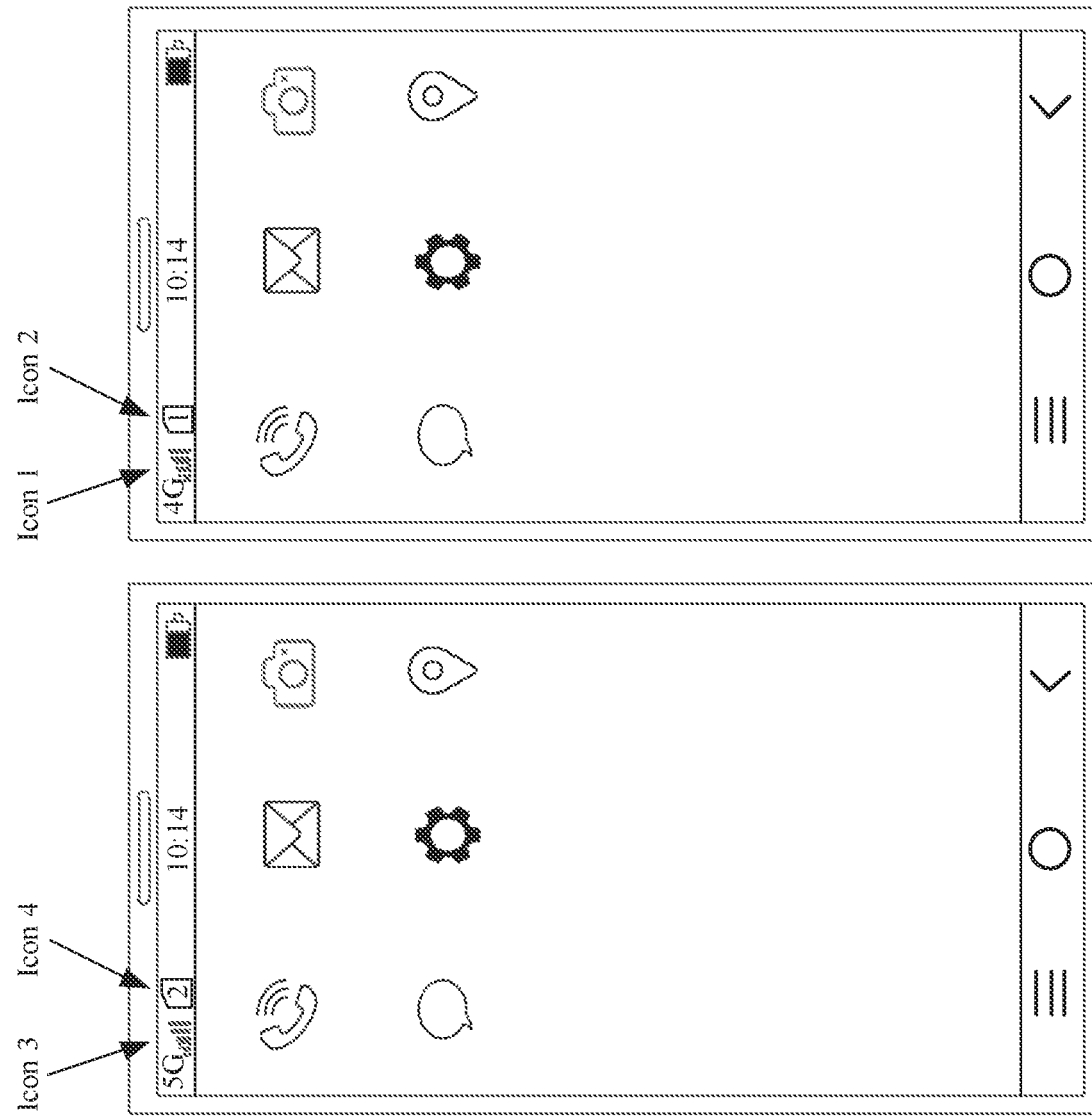
FIG. 9 is another schematic diagram of a display interface of a terminal device.

FIG. 9 is another schematic diagram of a display interface of a terminal device. In FIG. 9, it is assumed that before the terminal device passes through a target section, a user selects the second SIM card as a primary card for communication. In a display interface 1A displayed by the display apparatus, an icon 3 may be used to display signal strength of a current SIM card, and "2" in an icon 4 is used to indicate that the second SIM card selected by the user serves as the primary card. In this case, if the terminal device determines, based on the embodiment shown in FIG. 5 or FIG. 7, that the target SIM card is the first SIM card, and a SIM card currently used by the terminal device is different from the target SIM card, the primary card used by the terminal device needs to be switched from the second SIM card to the first SIM card. Therefore, when the terminal device completes SIM card switching and passes through the target section, in a display interface 2B, an icon 1 is used to display signal strength of a current SIM card, and "1" in an icon 2 is used to indicate that the terminal device currently uses the first SIM card as the primary card. Therefore, the user may learn, by using a change of the display interface 2A to the display interface 2B, that the primary card used by the terminal device is switched at this time.

Alternatively, the icon representation manners and specific designs of the icons shown in FIG. 8 and FIG. 9 are merely examples for description. In another possible implementation, the icons 1 to 4 in FIG. 8 and FIG. 9 may not be set on the display interface of the terminal device. In this case, when using the terminal device, the user does not directly sense, from the display interface, whether the primary card is switched, and the user can use another function on the display interface of the terminal device without disturbing effect.

Embodiment 10

Figure 10:
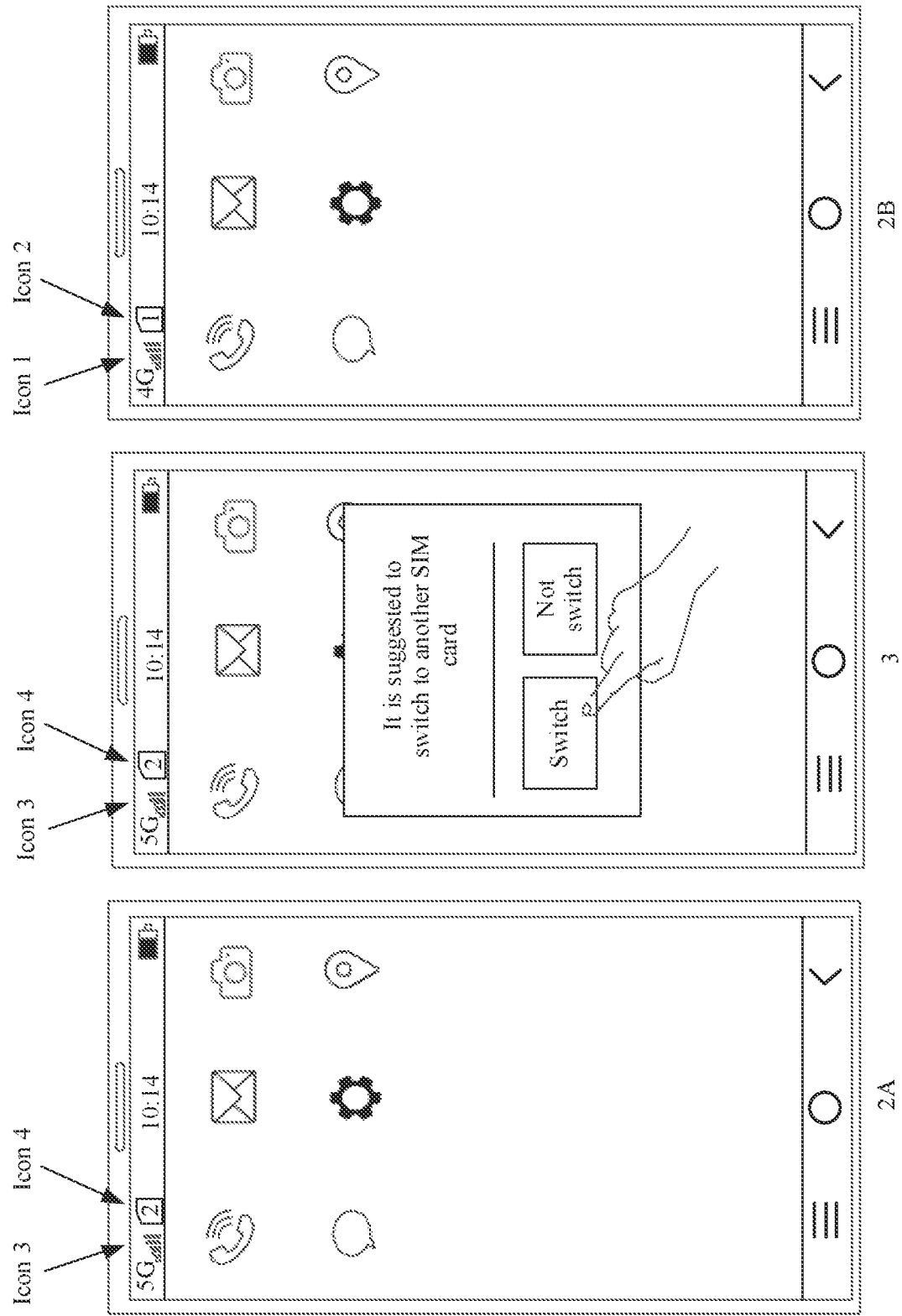
FIG. 10 is still another schematic diagram of a display interface of a terminal device.

Optionally, in the embodiment shown in FIG. 9, when the terminal device performs SIM card switching before passing through the target section, "automatic" switching of the terminal device can be implemented without a user indication or a user notification. In another possible implementation, FIG. 10 is still another schematic diagram of a display interface of a terminal device. Based on the display interface 2A shown in FIG. 9, in this case, if the terminal device determines, based on the embodiment shown in FIG. 5 or FIG. 7, that the target SIM card is the first SIM card, and a SIM card currently used by the terminal device is different from the target SIM card, the primary card used by the terminal device needs to be switched from the second SIM card to the second SIM card. However, the terminal device does not immediately perform switching, but displays switching prompt information to the user by using a dialog box popped up in a display interface 3, to notify the user of "It is suggested to switch to another SIM card". Then, after receiving confirmation information sent by the user by tapping a control "switch" in the display interface 3, the terminal device performs a switching action of switching the primary card from the currently used SIM card to the target SIM card. After the switching, an icon 1 in a display interface 2B is used to display signal strength of a current SIM card, and "1" in an icon 2 is used to indicate that the terminal device currently uses the first SIM card as the primary card.

Embodiment 11

Figure 11:
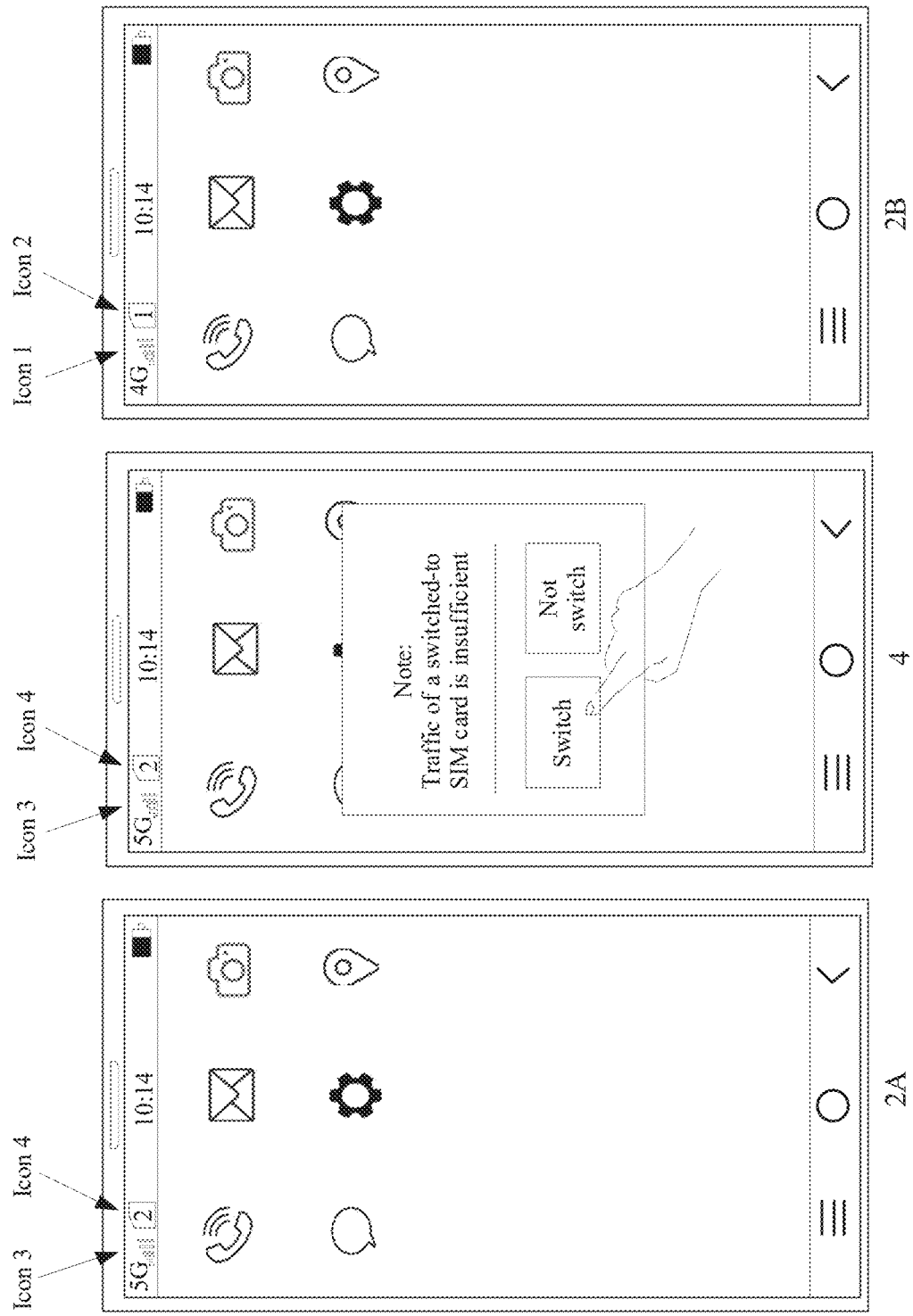
FIG. 11 is yet another schematic diagram of a display interface of a terminal device.

Alternatively, optionally, in the embodiment shown in FIG. 9, because SIM card switching performed by the terminal device is "automatic", if a problem such as insufficient traffic or arrears occurs on the target SIM card, the terminal device directly performs "automatic" switching, and an economic loss may be caused. Therefore, in another possible implementation, FIG. 11 is yet another schematic diagram of a display interface of a terminal device. The terminal device may determine, before the switching, whether the traffic of the target SIM card to be switched is insufficient, whether the target SIM card is in arrears, or the like, Once it is determined that the traffic of the target SIM card is insufficient, a dialog box popped up in a display interface 4 may be used to notify the user that the traffic of the "switched-to SIM card" is insufficient, so that the user chooses whether to perform switching. It is assumed that the user is going to perform an emergency conference call, and even if the traffic is insufficient, switching needs to be performed, and a "Switch" control may be tapped, so that the terminal device receives a tap on the "Switch" control by the user, then, perform a switching action of switching the primary card from the second SIM card to the second SIM card. After the switching, an icon 1 in a display interface 2B is used to display signal strength of a current SIM card, and "1" in an icon 2 is used to indicate that the terminal device currently uses the first SIM card as the primary card.

Embodiment 12

Figure 12:
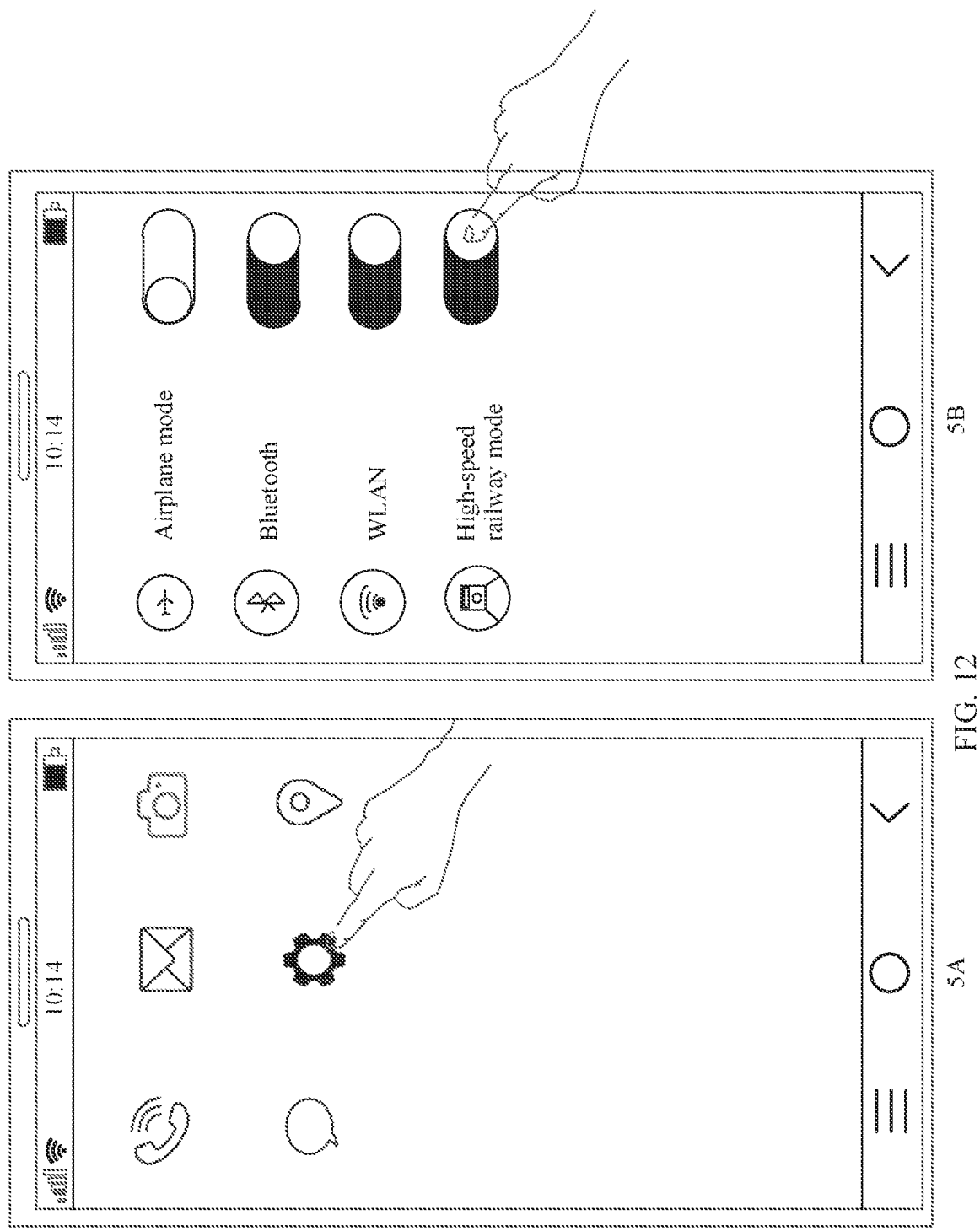
FIG. 12 is still yet another schematic diagram of a display interface of a terminal device.

Optionally, FIG. 12 is still yet another schematic diagram of a display interface of a terminal device. The terminal device allows a user to set whether to enable a high-speed railway mode. For example, after tapping an icon control corresponding to a "setting" function in a display interface 5A of the terminal device, the user may set, in a display interface SB of the setting function, a switch corresponding to a "high-speed railway mode" to an enabled or disabled state. It may be understood that when the user sets the switch of the high-speed railway mode to the enabled state, after determining that the terminal device is in the high-speed railway mode, the terminal device performs the communication method shown in FIG. 5 or FIG. 7, and may report information about an operator of a SIM card to the network device, automatically switch the SIM card, and the like. When the user sets the switch of the high-speed railway mode to the disabled state, the terminal device does not perform the communication method shown in FIG. 5 or FIG. 7, and does not automatically switch the SIM card. Alternatively, when determining to move on a first preset path and currently stored preset path information includes network status information on the first preset path, the terminal device may perform the communication method shown in FIG. 5 or FIG. 7, to report information about an operator of the SIM card to the network device, automatically switch the SIM card, and the like.

In the foregoing embodiments, the communication method provided in embodiments of this application is described. To implement the functions in the method provided in embodiments of this application, the terminal device and the network device that are used as execution bodies may include a hardware structure and/or a software module, and implement the functions in a form of the hardware structure, the software module, or a combination of the hardware structure and the software module, Whether a function in the foregoing functions is implemented by using the hardware structure, the software module, or the combination of the hardware structure and the software module depends on particular applications and design constraints of the technical solutions.

Figure 13:
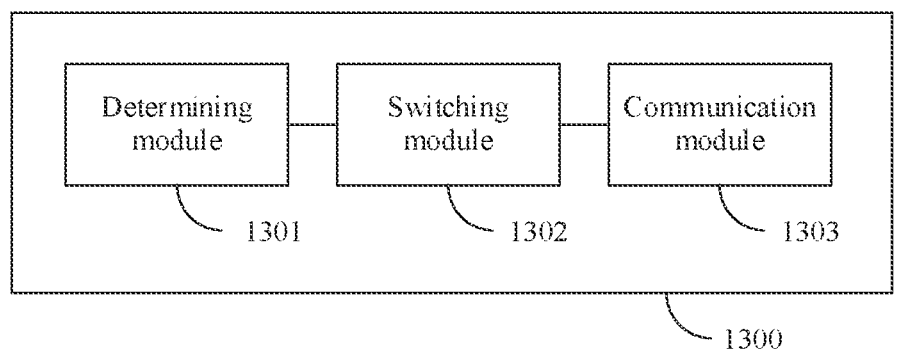
FIG. 13 is a schematic diagram of a structure of an embodiment of a communication apparatus according to this application.

For example, FIG. 13 is a schematic diagram of a structure of an embodiment of a communication apparatus according to this application. The communication apparatus 1300 shown in FIG. 13 may be used as the terminal device in any one of the foregoing embodiments of this application, and perform the method performed by the terminal device. Specifically, the apparatus shown in FIG. 13 includes a determining module 1301, a switching module 1302, and a communication module 1303. The communication module 1303 may be one of at least two communication modules in the terminal device, or may be a communication module that is used as a primary card and that is in two communication modules, or may be another communication module. The determining module 1301 is configured to: before entering a target section on a first preset path, determine a target communication module from the at least two communication modules based on prestored network status information of the at least two communication modules in the target section; or receive first indication information sent by a network device, where the first indication information is used to indicate a target communication module, and the target communication module is determined by the network device from the at least two communication modules based on prestored network status information of the at least two communication modules in the target section. The switching module 1302 is configured to: before or when entering the target section, switch a communication module used by the terminal from a first communication module to the target communication module. The communication module 1303 is configured to perform communication by using the target communication module.

Optionally, the determining module 1301 is specifically configured to: obtain preset path information, where the preset path information includes network status information of operators to which the at least two communication modules belong on at least one preset path, and the at least one preset path includes the first preset path; and determine the target communication module from the at least two communication modules based on the preset path information.

Optionally, the determining module 1301 is specifically configured to: obtain the preset path information sent by a network device, where the preset path information includes network status information of a plurality of operators on a plurality of preset paths, and the plurality of operators include the operators to which the at least two communication modules belong. Alternatively, the communication module 1303 is specifically configured to: send second indication information to a network device, where the second indication information is used to indicate information about the operators to which the at least two communication modules belong; and receive the preset path information that is sent by the network device and that includes the operators to which the at least two communication modules belong.

Optionally, the preset path information includes the network status information of the operators to which the at least two communication modules belong on the at least one preset path, and the first preset path of the at least one path includes the target section.

Optionally, the network status information includes an ID of a cell that is in continuous nodes and that is covered by a network of an operator, where each node is a section of a preset length on a preset path. In this case, the determining module 1301 is specifically configured to: weight, based on a coverage area, a cell that is of a network of an operator to which each of the at least two communication modules belongs and that is in the target section, to obtain weighted coverage area values that are of the networks of the operators to which the at least two communication modules respectively belong and that are in the target section; and determine, from the at least two communication modules, a communication module corresponding to a network that has a largest weighted coverage area value and that is of the networks of the operators as the target communication module.

Optionally, the network information includes an ID of a cell that is in continuous nodes and that is covered by a network of an operator, and a communication quality parameter of each cell, where each node is a section of a preset length on a preset path. In this case, the determining module 1301 is specifically configured to: weight, based on a communication quality parameter of each cell, cells that are of a network of an operator to which each of the at least two communication modules belongs and that are in the target section, to obtain weighted communication quality values that are of the networks of the operators to which the at least two communication modules respectively belong and that are in the target section; and determine, from the at least two communication modules, a communication module that has a largest weighted communication quality parameter value and that is of the operators as the target communication module.

Optionally, the switching module 1302 is specifically configured to: in the last cell that is covered by both the first communication module and the target communication module before entering the target section, or in the first cell that is covered by both the first communication module and the target communication module after entering the target section, switch the communication module used by the terminal from the first communication module to the target communication module.

Optionally, the determining module 1301 is specifically configured to: determine that the terminal is in a high-speed railway mode; and when the terminal is in the high-speed railway mode, before entering a target section on a first preset path, determine a target communication module from the at least two communication modules based on prestored network status information of the at least two communication modules in the target section; or when the terminal moves on the first preset path, determine a target communication module from the at least two communication modules based on prestored network status information of the at least two communication modules in the target section.

Optionally, the apparatus further includes a display module, configured to display switching prompt information on a display interface. In this case, the determining module 1301 is specifically configured to: when receiving confirmation information from a user, switch the communication module used by the terminal from the first communication module to the target communication module.

Optionally, the communication module is a subscriber identity module. Optionally, the subscriber identity module includes a subscriber identity module SIM card, a universal subscriber identity module USIM card, or an embedded subscriber identity module eSIM card.

For a specific implementation and a principle of the communication apparatus provided in this embodiment, refer to the method performed by the terminal device in the foregoing embodiments of this application. The implementation and the principle are the same, and details are not described again.

Figure 14:
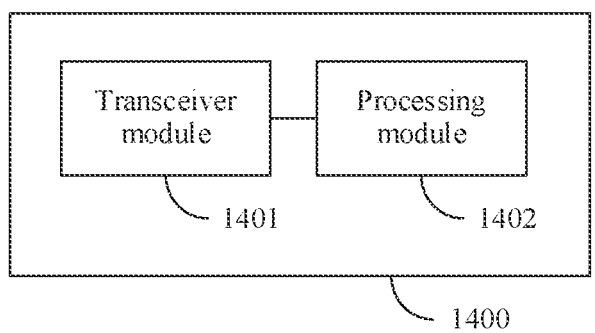
FIG. 14 is a schematic diagram of a structure of another embodiment of a communication apparatus according to this application.

FIG. 14 is a schematic diagram of a structure of another embodiment of a communication apparatus according to this application. The communication apparatus 1400 shown in FIG. 14 may be used as the network device in any one of the foregoing embodiments of this application, and perform the method performed by the network device. Specifically, the apparatus shown in FIG. 14 includes a transceiver module 1401 and a processing module 1402. The transceiver module 1401 is configured to receive second indication information sent by a terminal, where the second indication information is used to indicate information about an operator to which at least two communication modules disposed in the terminal belong, and the at least two communication modules belong to different operators. The transceiver module 1401 is further configured to: send, to the terminal, preset path information including network status information of the at least two communication modules, where the preset path information includes network status information of the at least two communication modules on a first preset path, and the first preset path includes a target section; or determine, from the at least two communication modules based on the preset path information, a target communication module to be used by the terminal in a target section, where the preset path information includes network status information of the at least two communication modules on a first preset path; and send first indication information to the terminal, where the first indication information is used to indicate the target communication module.

Optionally, the network status information includes an ID of a cell that is in continuous nodes and that is covered by a network of an operator, where each node is a section of a preset length on a preset path.

Optionally, the processing module 1402 is specifically configured to: weight, based on a coverage area, a cell that is of a network of an operator to which each of the at least two communication modules belongs and that is in the target section, to obtain weighted coverage area values that are of the networks of the operators to which the at least two communication modules respectively belong and that are in the target section; and determine, from the at least two communication modules, a communication module corresponding to a network that has a largest weighted coverage area value and that is of the networks of the operators as the target communication module.

Optionally, the network status information includes an ID of a cell that is in continuous nodes and that is covered by a network of an operator, and a communication quality parameter of each cell.

Optionally, the processing module 1402 is specifically configured to: weight, based on a communication quality parameter of each cell, cells that are of a network of an operator to which each of the at least two communication modules belongs and that are in the target section, to obtain weighted communication quality values that are of the networks of the operators to which the at least two communication modules respectively belong and that are in the target section; and determine, from the at least two communication modules, a communication module that has a largest weighted communication quality parameter value and that is of the operators as the target communication module.

Optionally, the communication module is a subscriber identity module. Optionally, the subscriber identity module includes a subscriber identity module SIM card, a universal subscriber identity module USIM card, or an embedded subscriber identity module eSIM card.

For a specific implementation and a principle of the communication apparatus provided in this embodiment, refer to the method performed by the network device in the foregoing embodiments of this application. The implementation and the principle are the same, and details are not described again.

It should be noted and understood that division of the modules of the foregoing apparatus is merely logic function division. During actual implementation, some or all modules may be integrated into one physical entity, or the modules may be physically separated. In addition, all these modules may be implemented in a form of software invoked by a processor element, or may be implemented in a form of hardware. Alternatively, some modules may be implemented in a form of software invoked by a processor element, and some modules are implemented in a form of hardware. For example, the processing module may be an independently disposed processor element, or may be integrated into a chip of the foregoing apparatus for implementation. In addition, the processing module may be stored in a memory of the foregoing apparatus in a form of program code, and is invoked by a processor element of the foregoing apparatus, to perform a function of the foregoing determining module. An implementation of another module is similar to the implementation of the determining module. In addition, all or some of the modules may be integrated together, or may be implemented independently. The processor element herein may be an integrated circuit, and have a signal processing capability. In an implementation process, steps in the foregoing methods or the foregoing modules can be implemented by using a hardware integrated logical circuit in the processor element, or by using instructions in a form of software.

For example, the foregoing modules may be configured as one or more integrated circuits for implementing the foregoing method, such as one or more application-specific integrated circuits (application-specific integrated circuits. ASICs), one or more microprocessors (digital signal processors, DSPs), or one or more field-programmable gate arrays (field-programmable gate arrays, FPGAs). For another example, when one of the foregoing modules is implemented in a form of a program code invoked by a processor element, the processor element may be a general-purpose processor, for example, a central processing unit (central processing unit, CPU) or another processor that can invoke the program code. For another example, the modules may be integrated together, and implemented in a form of a system-on-a-chip (system-on-a-chip, SOC).

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk solid state disk (SSD)), or the like.

Figure 15:
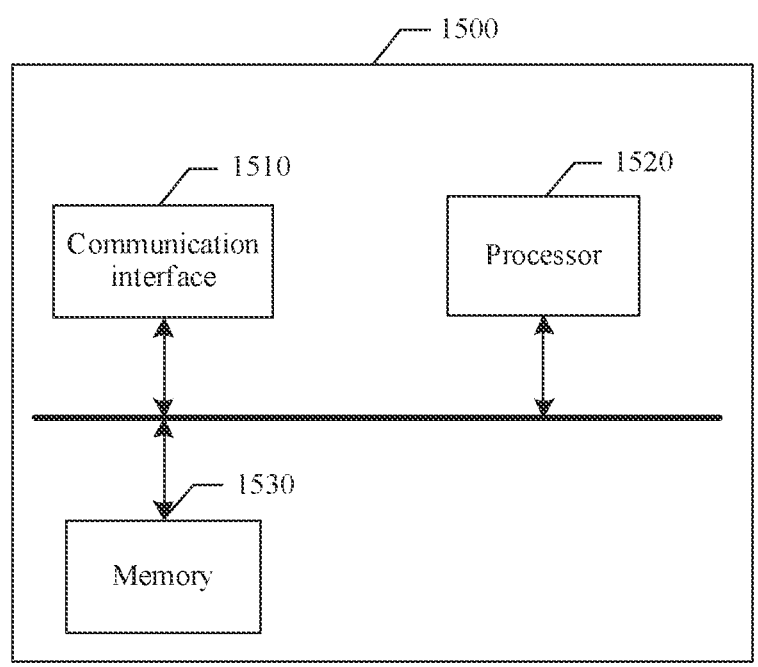
FIG. 15 is a schematic diagram of a structure of a communication apparatus according to this application.

In addition, an embodiment of this application further provides another structure of a communication apparatus that can be configured to implement the terminal device or the network device provided in this application. FIG. 15 is a schematic diagram of a structure of a communication apparatus according to this application. As shown in FIG. 15, the communication apparatus 1500 may include a communication interface 1510 and a processor 1520. Optionally, the communication apparatus 1500 may further include a memory 1530. The memory 1530 may be disposed inside the communication apparatus, or may be disposed outside the communication apparatus.

For example, all actions performed by the terminal device in the foregoing embodiments of this application may be implemented by the processor 1520. The processor 1520 sends data through the communication interface 1510. In an implementation process, steps in a processing procedure may implement, by using an integrated logic circuit of hardware in the processor 1520 or an instruction in a form of software, a method performed by the terminal device. For brevity, details are not described herein again. Program code executed by the processor 1520 to implement the foregoing method may be stored in the memory 1530. The memory 1530 is connected to the processor 1520, for example, is coupled to the processor 1520.

For another example, all actions performed by the network device in the foregoing embodiments of this application may be implemented by the processor 1520. The processor 1520 sends a control signal and communication data through the communication interface 1510, and is configured to implement any method performed by the network device. In an implementation process, steps in a processing procedure may implement, by using an integrated logic circuit of hardware in the processor 1520 or an instruction in a form of software, a method performed by the network device. For brevity, details are not described herein again. Program code executed by the processor 1520 to implement the foregoing method may be stored in the memory 1530. The memory 1530 is connected to the processor 1520, for example, is coupled to the processor 1520.

Some features of this embodiment of this application may be implemented/supported by the processor 1520 by executing program instructions or software code in the memory 1530. Software components loaded on the memory 1530 may be summarized in terms of functions or logic.

Any communication interface in embodiments of this application may be a circuit, a bus, a transceiver, or another apparatus that may be configured to exchange information, for example, the communication interface 1510 in the communication apparatus 1500. For example, the another apparatus may be a device connected to the communication apparatus. For example, when the communication apparatus is a terminal device, the another apparatus may be a network device; or when the communication apparatus is a network device, the another apparatus may be a terminal device.

In embodiments of this application, the processor may be a general-purpose processor, a digital signal processor, an application-specific integrated circuit, a field-programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

Couplings in embodiments of this application are indirect couplings or communication connections between apparatuses, units, or modules, may be in an electrical form, a mechanical form, or another form and are used for information exchange between the apparatuses, the units, and the modules.

The processor may operate with the memory. The memory may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory is any other medium that can carry or store expected program code in a form of an instruction or a data structure and that can be accessed by a computer, but is not limited thereto.

A specific connection medium between the communication interface, the processor, and the memory is not limited in embodiments of this application. For example, the memory, the processor, and the communication interface may be connected through a bus. The bus may be classified into an address bus, a data bus, a control bus, and the like. Certainly, a connection bus between the processor and the memory is not the connection bus between the terminal device and the network device.

In embodiments of this application, "at least one" means one or more, and "a plurality of" means two or more. The term "and/or" describes an association relationship between associated objects and represents that three relationships may exist. For example, A and/or B may indicate the following cases: Only A exists, both A and B exist, and only B exists, where A and B may be singular or plural. The character "/" usually indicates an "or" relationship between associated objects. In a formula, the character "/" indicates a "division" relationship between associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

It may be understood that various numbers in embodiments of this application are merely differentiated for ease of description, and are not intended to limit the scope of embodiments of this application. It may be understood that, in embodiments of this application, sequence numbers of the foregoing processes do not mean execution sequences. The execution sequences of the processes should be determined based on functions and internal logic of the processes, and should not be construed as any limitation on implementation processes in embodiments of this application.

Finally, it should be noted that the foregoing embodiments are merely intended to describe the technical solutions of this application, but not to limit the technical solutions. Although this application is described in detail with reference to the foregoing embodiments, a person of ordinary skill in the art should understand that he or she may still make modifications to the technical solutions recorded in the foregoing embodiments, or make equivalent replacements to some or all of the technical features thereof. However, these modifications or replacements do not make corresponding technical solutions essentially depart from the scope of the technical solutions in embodiments of this application.

What is claimed is:

1. A method implemented by a terminal, wherein the method comprises:
    before entering a target section on a first preset path, determining a target communication system from at least two communication systems based on prestored network status information of the at least two communication systems in the target section, wherein the prestored network status information comprises an identifier of a first cell that is in continuous nodes and that is covered by a first network of a first operator, wherein each node is a section of a preset length on the first preset path, and wherein determining the target communication system comprises:
        weighting, based on a coverage area, a second cell that is of a second network of a second operator to which each of the at least two communication systems belongs and that is in the target section to obtain weighted coverage area values that are of networks of different operators and that are in the target section; and
        determining, from the at least two communication systems, a first communication system corresponding to a third network that has a largest weighted coverage area value and that is of the networks as the target communication system;
    switching from the first communication system to the target communication system before or when entering the target section; and
    performing communication using the target communication system.

2. The method of claim 1, further comprising:
    obtaining preset path information comprising first network status information of the different operators to which the at least two communication systems belong on at least one preset path, wherein the at least one preset path comprises the first preset path; and
    further determining the target communication system from the at least two communication systems based on the preset path information.

3. The method of claim 2, wherein obtaining the preset path information comprises:
    obtaining the preset path information from a network device, wherein the preset path information further comprises second network status information of a plurality of operators on a plurality of preset paths, and wherein the operators comprise the different operators; or
    sending, to the network device, indication information indicating first information about the different operators and receiving, from the network device, the preset path information comprising the different operators.

4. The method of claim 2, wherein the preset path information comprises the first network status information, and wherein the first preset path comprises the target section.

5. The method of claim 1, wherein the identifier comprises a communication quality parameter of each cell, and wherein the method further comprises:
    weighting, based on the communication quality parameter of each cell, cells that are of the second network to which each of the at least two communication systems belongs and that are in the target section to obtain weighted communication quality values that are of networks of the different operators and that are in the target section; and
    determining, from the at least two communication systems, a second communication system that has a largest weighted communication quality parameter value and that is of the different operators as the target communication system.

6. The method of claim 1, wherein the target section is either:
    a first section that is between N continuous nodes in front of a movement direction of the terminal and that is on the first preset path, wherein N is a positive integer; or
    a second section that is between two target locations in front of the movement direction and that is on the first preset path.

7. The method of claim 1, further comprising further switching the terminal from the first communication system to the target communication system either in a last cell that is covered by both the first communication system and the target communication system before entering the target section or in a third cell that is covered by both the first communication system and the target communication system after entering the target section.

8. The method of claim 1, wherein determining the target communication system comprises:
   determining whether the terminal is in a high-speed railway mode;
   further determining, before entering the target section, the target communication system from the at least two communication systems based on the prestored network status information when the terminal is in the high-speed railway mode; and
   further determining the target communication system from the at least two communication systems based on the prestored network status information when the terminal moves on the first preset path.

9. The method of claim 1, further comprising:
   displaying switching prompt information on a display interface;
   receiving confirmation information from a user on the display interface in response to the switching prompt information; and
   further switching, in response to receiving the confirmation information, the terminal from the first communication system to the target communication system.

10. The method of claim 1, wherein each of the at least two communication systems is a subscriber identity module (SIM), and wherein the SIM comprises a SIM card, a universal SIM (USIM) card, or an embedded SIM (eSIM) card.

11. A terminal comprising:
   at least two communication systems comprising a first communication system, wherein the at least two communication systems belong to different operators, and wherein the first communication system is configured to perform communication; and
   a processor coupled to the at least two communication systems and configured to:
      before entering a target section on a first preset path, determine a target communication system from the at least two communication systems based on prestored network status information of the at least two communication systems in the target section, wherein the prestored network status information comprises an identifier of a first cell that is in continuous nodes and that is covered by a first network of a first operator, wherein each node is a section of a preset length on the first preset path, and wherein the processor is further configured to determine the target communication system by:
         weighting, based on a coverage area, a second cell that is of a second network of a second operator to which each of the at least two communication systems belongs and that is in the target section to obtain weighted coverage area values that are of networks of different operators and that are in the target section; and
         determining, from the at least two communication systems, a first communication system corresponding to a third network that has a largest weighted coverage area value and that is of the networks as the target communication system;
      switch, before or when entering the target section, the terminal from the first communication system to the target communication system; and
      perform communication using the target communication system.

12. The terminal of claim 11, wherein the processor is further configured to:
   obtain preset path information comprising first network status information of the different operators to which the at least two communication systems belong on at least one preset path, wherein the at least one preset path comprises the first preset path; and
   further determine the target communication system from the at least two communication systems based on the preset path information.

13. The terminal of claim 12, wherein the processor is further configured to:
   obtain the preset path information from a network device, wherein the preset path information further comprises second network status information of a plurality of operators on a plurality of preset paths, and wherein the operators comprise the different operators; or
   send, to the network device, indication information indicating first information about the different operators and receive, from the network device, the preset path information comprising the different operators.

14. The terminal of claim 12, wherein the preset path information comprises the first network status information, and wherein the first preset path comprises the target section.

15. The terminal of claim 11, wherein the identifier comprises a communication quality parameter of each cell, and wherein the processor is further configured to:
   weight, based on the communication quality parameter of each cell, cells that are of the second network to which each of the at least two communication systems belongs and that are in the target section to obtain weighted communication quality values that are of networks of the different operators and that are in the target section; and
   determine, from the at least two communication systems, a second communication system that has a largest weighted communication quality parameter value and that is of the different operators as the target communication system.

16. A computer program product comprising computer-executable instructions that are stored on a non-transitory computer storage medium and that, when executed by a processor, cause a terminal to:
   before entering a target section on a first preset path, determine a target communication system from at least two communication systems based on prestored network status information of the at least two communication systems in the target section, wherein the prestored network status information comprises an identifier of a first cell that is in continuous nodes and that is covered by a first network of a first operator, wherein each node is a section of a preset length on the first preset path, and wherein to determine the target communication system, the instructions that, when executed by the processor, cause the terminal to:
      weight, based on a coverage area, a second cell that is of a second network of a second operator to which each of the at least two communication systems belongs and that is in the target section to obtain weighted coverage area values that are of networks of different operators and that are in the target section; and determine, from the at least two communication systems, a first communication system corresponding to a third network that has a largest weighted coverage area value and that is of the networks as the target communication system;

switch from the first communication system to the target communication system before or when entering the target section; and perform communication using the target communication system.

17. The computer program product of claim 16, wherein the target section is a section that is between N continuous nodes in front of a movement direction of the terminal and that is on the first preset path, wherein N is a positive integer.

18. The computer program product of claim 16, wherein the target section is a section that is between two target locations in front of a movement direction of the terminal and that is on the first preset path.

19. The computer program product of claim 16, wherein each of the at least two communication systems is a subscriber identity module (SIM).

20. The computer program product of claim 19, wherein the SIM comprises a SIM card, a universal SIM (USIM) card, or an embedded SIM (eSIM) card.

* * * * *